(12) United States Patent
Okubo et al.

(10) Patent No.: US 7,141,887 B2
(45) Date of Patent: Nov. 28, 2006

(54) POWER SUPPLY UNIT, GENERATOR, AND WIND TURBINE GENERATOR

(75) Inventors: Kazuo Okubo, Ise (JP); Kazumichi Kato, Ise (JP); Masami Morita, Ise (JP); Katsuyoshi Nakano, Ise (JP); Tsutomu Shinya, Ise (JP)

(73) Assignee: Shinko Electric Co., Ltd., Tokyo (JP)

( * ) Notice: Subject to any disclaimer, the term of this patent is extended or adjusted under 35 U.S.C. 154(b) by 0 days.

(21) Appl. No.: 10/489,779

(22) PCT Filed: Jan. 7, 2004

(86) PCT No.: PCT/JP2004/000019

§ 371 (c)(1),
(2), (4) Date: Nov. 3, 2005

(87) PCT Pub. No.: WO2005/040606

PCT Pub. Date: May 6, 2005

(65) Prior Publication Data

US 2006/0055377 A1    Mar. 16, 2006

(30) Foreign Application Priority Data

| Oct. 24, 2003 | (JP) | ............................. 2003-365029 |
| Oct. 24, 2003 | (JP) | ............................. 2003-365030 |
| Oct. 24, 2003 | (JP) | ............................. 2003-365031 |
| Oct. 24, 2003 | (JP) | ............................. 2003-365034 |
| Oct. 24, 2003 | (JP) | ............................. 2003-365035 |

(51) Int. Cl.
*H02P 9/00* (2006.01)

(52) U.S. Cl. .......................................... 290/44; 290/55

(58) Field of Classification Search ..................... None
See application file for complete search history.

(56) References Cited

U.S. PATENT DOCUMENTS 2,475,252 A * 7/1949 Phinney ....................... 290/44
2,547,636 A * 4/1951 Fumagalli .................... 290/44
4,002,218 A * 1/1977 Horvat ....................... 180/2.2

(Continued)

FOREIGN PATENT DOCUMENTS

DE            3901430 A1 * 7/1990

(Continued)

OTHER PUBLICATIONS

Baird et al. Australian Publcation No. AU 828729A, Abstract of May 12, 1983.*

*Primary Examiner*—Joseph Waks
(74) *Attorney, Agent, or Firm*—Oblon, Spivak, McClelland, Maier & Neustadt, P.C.

(57) ABSTRACT

A power supply unit inclding a battery 4 that stores electric power used for operations of various devices; a dynamo 19, a rotation support mechanism 14, and a rectifying section 32 as charging means that converts natural energy into electric energy and supplies electric power of the electric energy to the battery 4 to be charged; a charging control section 36 for changing over between supply and stop of the electric power from the charging means to the storage means; and a charging control driving unit 45 and a low-voltage charging function of an arithmetic processing part 51 as charging changeover control means that controls the charging control section 36 such that supply and stop of the electric power are repeated when the charging voltage for charging the battery 4 with electric power is not less than a predetermined value, and continues supply of the electric power when the charging voltage is less than the predetermined value.

31 Claims, 13 Drawing Sheets

U.S. PATENT DOCUMENTS

| | | | |
|---|---|---|---|
| 4,039,849 A * | 8/1977 | Mater et al. | 290/55 |
| 4,446,376 A * | 5/1984 | Baker | 290/44 |
| 4,464,579 A * | 8/1984 | Schwarz | 290/44 |
| 4,613,763 A * | 9/1986 | Swansen | 290/44 |
| 4,620,834 A * | 11/1986 | Baird et al. | 416/32 |
| 4,742,291 A * | 5/1988 | Bobier et al. | 320/101 |
| 6,885,114 B1 * | 4/2005 | Baarman et al. | 290/43 |
| 6,998,723 B1 * | 2/2006 | Kong et al. | 290/1 C |
| 7,040,858 B1 * | 5/2006 | Suzuki | 415/4.2 |
| 2003/0209912 A1 * | 11/2003 | Badger | 290/55 |

FOREIGN PATENT DOCUMENTS

| | | | |
|---|---|---|---|
| GB | 2190554 A * | 11/1987 | |
| JP | 7-170671 | | 7/1995 |
| JP | 2000-249036 | | 9/2000 |
| JP | 2001186740 A * | 7/2001 | |
| JP | 2003021046 A * | 1/2003 | |
| JP | 2003-56446 | | 2/2003 |
| JP | 2003-70296 | | 3/2003 |
| JP | 2003-199252 | | 7/2003 |
| JP | 2003-244997 | | 8/2003 |
| JP | 2003-299396 | | 10/2003 |
| JP | 2003278637 A * | 10/2003 | |
| JP | 2003284393 A * | 10/2003 | |
| JP | 2003327678 A * | 11/2003 | |

* cited by examiner

US 7,141,887 B2

POWER SUPPLY UNIT, GENERATOR, AND WIND TURBINE GENERATOR

TECHNICAL FIELD

The present invention relates to a power supply unit, a generator, and a wind turbine generator for converting natural energy such as wind energy into electric energy to be used as electric power for various devices.

BACKGROUND ART

JP-A-2003-284393, JP-A-2003-21046, JP-A-2003-327678, and JP-A-2003-278637 disclose generators for generating electric power using natural energy such as wind power. In such a generator, a rotating shaft to be rotated by wind power is connected to a dynamo to convert kinetic energy into electric power of electric energy. The generator includes therein a power supply unit in which a battery is charged with the electric power as power supply for various devices such as electric lights. Thereby, the generator can stably supply electric power irrespective of presence/absence of wind or a change in wind.

However, charging is performed with a high charging voltage upon a strong wind for example, while charging is performed with a low charging voltage upon a weak wind. Thus, the battery is charged with the charging voltage that may change widely. There is a problem that such a conventional generator is low in charging efficiency.

In addition, natural energy is very unstable energy. If electric power is continuously supplied to an external load while no electric power is supplied from the generator for a long time or when the electric power that can be obtained from natural energy is insufficient in itself for the external load, the battery may be over discharged. This causes a problem of shortening the life of the battery.

Further, in case that a state of windlessness continues for a long time, even while power supply to external devices is stopped, the discharge of the battery goes on and the charging voltage is extremely lowered. This causes a problem of bringing about a trouble in which an external controller erroneously operates or can not operate because of electric power of a too low voltage.

Further, in case that the rotating shaft to be rotated by wind power is connected to the dynamo for electric power generation, the rotating shaft must bear the load for operating the dynamo. In this case, when the wind power is weak in comparison with the load, the wind turbine may stop. This causes a problem of making sufficient generation impossible.

Further, if the maximum electric current is always supplied continuously from the start of an operation of an electromagnetic clutch, which is provided for idling the wind turbine upon a breeze, to the end of the operation of the clutch, the consumption of the supplied current is large. This causes a problem of decreasing the gain to the electric power obtained from the dynamo.

Therefore, a first object of the present invention is to make it possible to efficiently charge the battery even in case that the charging voltage changes widely because of a change in wind power.

A second object of the present invention is to prevent storage means from being over discharged even in case of unstable electric power supplied from generating means, and to protect thereby the storage means.

A third object of the present invention is to keep the battery in the charging voltage of a predetermined value or more even in case that a state of windlessness continues for a long time.

A fifth object of the present invention is to make it possible to realize sufficient generation of electric power even in case of small natural energy.

A fifth object of the present invention is to make it possible to realize effective generation of electric power.

DISCLOSURE OF THE INVENTION

A power supply unit of the present invention comprises a storage means for storing electric power that is used for operations of various devices; a charging means for transforming natural energy into an electrical energy, and charging by supplying an electric power as the electric energy to the storage means; a charging changeover means for changing over between supply and stop of the electric power from the charging means to the storage means; and a charging changeover control means for controlling the charging changeover means such that supply and stop of the electric power are repeated when a charging voltage for charging the storage means with electric power is not less than a predetermined value, and continues supply of the electric power when the charging voltage is less than the predetermined value.

According to this feature, when the charging voltage to the storage means is not less than the predetermined value because of large natural energy, supply and stop of electric power to the storage means are repeated and thereby the storage means is charged with charging current being throttled under a high charging voltage. On the other hand, when the charging voltage to the storage means is less than the predetermined value because of small natural energy, by continuing supply of electric power to the storage means, the storage means is charged with charging current as large as possible under a low charging voltage. Therefore, even in case that the charging voltage may change widely due to increase/decrease of the natural energy, the storage means can be efficiently charged.

In addition, a power supply unit of the present invention comprises a storage means for storing electric power that is used for operations of various devices; a charging means for transforming natural energy into an electrical energy, and charging by supplying an electric power as the electric energy to the storage means; a charging changeover means for changing over between supply and stop of the electric power from the charging means to the storage means; and a charging changeover control means for controlling the charging changeover means such that supply and stop of the electric power is changed over at stop time intervals corresponding to a charging voltage for charging the storage means with electric power.

According to this feature, when the charging voltage for charging the storage means is raised because of large natural energy, the supply time is shortened because of an increase in stop time interval. Thus, the storage means is charged with charging current being throttled. On the other hand, when the charging voltage for charging the storage means is lowered because of small natural energy, the supply time is elongated because of a decrease in stop time interval. Thus, the storage means is charged with charging current as large as possible under a low charging voltage. Therefore, even in case that the charging voltage may change widely due to increase/decrease of the natural energy, the storage means can be efficiently charged.

In addition, a power supply unit of the present invention comprises a storage means for storing electric power that is used for operations of various devices; a charging means for transforming natural energy into an electrical energy, and charging by supplying an electric power as the electric energy to the storage means; a charging changeover means for changing over between supply and stop of the electric power from the charging means to the storage means; and a charging changeover control means for controlling the charging changeover means such that supply and stop of the electric power are repeated at stop time intervals corresponding to a charging voltage for charging the storage means with electric power when the charging voltage is not less than a predetermined value, and continues supply of the electric power when the charging voltage is less than the predetermined value.

According to this feature, when the charging voltage for charging the storage means is not less than the predetermined value, supply and stop of electric power to the storage means are repeated and thereby the storage means is charged with charging current being throttled under a high charging voltage. On the other hand, when the charging voltage for charging the storage means is less than the predetermined value, by continuing supply of electric power to the storage means, the storage means is charged with charging current as large as possible under a low charging voltage.

In addition, a generator of the present invention comprises an electric power generation means for generating electric power; a storage means for storing electric power generated by the electric power generation means; an output means for outputting electric power stored in the storage means to an external load or stopping the output; a voltage detection means for detecting a voltage of the electric power generated by the electric power generation means; and a control means for controlling the output means. The control means stops the output of electric power to the external load when the voltage detected by the voltage detection means is not more than a predetermined value.

According to this feature, because the output of the electric power is stopped when the voltage of the electric power generated by the electric power generation means is insufficient, the storage means can be prevented from being over discharged. Thus, the storage means can be protected.

In addition, a power supply unit of the present invention comprises a storage means for storing electric power that is used for operations of various devices; a charging means for transforming natural energy into an electrical energy, and charging the storage means with the electric energy; an auxiliary charging means for charging the storage means with auxiliary electric power; and a charging control means for monitoring the charging voltage of the storage means and permitting that the auxiliary charging means charge auxiliary electric power to the storage means when the charging voltage is less than a predetermined value.

According to this feature, because the auxiliary charging means charges the storage means with auxiliary electric power when the charging voltage of the storage means has lowered to less than the predetermined value, the charging voltage of the storage means is always kept to the charging voltage of not less than the predetermined value. Thereby, a trouble can be prevented in which various devices erroneously operate or can not operate due to electric power of a too low voltage. In addition, the storage means can be prevented from being over discharged.

In addition, a power supply unit of the present invention comprises a storage means for storing electric power that is used for operations of various devices; a charging means for transforming natural energy into an electrical energy, and charging the storage means with the electric energy; and an auxiliary charging means for charging the storage means with auxiliary electric power such that the storage means has a charging voltage of not less than a predetermined value.

According to this feature, because the auxiliary charging means charges the storage means with auxiliary electric power when the charging voltage of the storage means has lowered to less than the predetermined value, the charging voltage of the storage means is always kept to the charging voltage of not less than the predetermined value. Thereby, a trouble can be prevented in which various devices erroneously operate or can not operate due to electric power of a too low voltage. In addition, the storage means can be prevented from being over discharged. Further, the storage means can be charged with the auxiliary electric power using a small number of parts.

In addition, a power supply unit of the present invention comprises a driving force generation means for generating driving force by converting natural energy into kinetic energy; a measurement means for measuring the magnitude of the driving force; an electric power generation means for generating electric power by being operated with the driving force of the driving force generation means; a changeover means for changing over between transmission and interruption of the driving force of the driving force generation means to the electric power generation means; and a changeover control means for controlling the changeover means such that the driving force from the driving force generation means to the electric power generation means is interrupted when the magnitude of the driving force measured by the measurement means is less than a predetermined value, and the driving force is transmitted from the driving force generation means to the electric power generation means when the magnitude of the driving force is not less than the predetermined value.

According to this feature, even in case of a small driving force, that is, even under conditions of small natural energy, by alternately repeating transmission and interruption of the driving force to the electric power generation means by the changeover control means, the generation efficiency of the electric power generation means can be improved. In case of small natural energy, the driving force is weak. In addition, some load may be applied to the driving force generation means when the driving force is transmitted to the electric power generation means. Therefore, when the driving force is weak in comparison with the load, there is a fear that the driving force generation means is stopped.

Such load can be eliminated by interrupting the transmission of the driving force to the electric power generation means when the driving force is less than the predetermined value. Thus, the driving force generation means can continue to operate without stopping. By using the force of inertia at this time, even when the driving force is transmitted to the electric power generation means, the driving force generation means does not stop. When the driving force has again lowered to less than the predetermined value, the transmission of the driving force to the electric power generation means is interrupted. Thereby, the driving force generation means continues to operate without stopping. By this manner, even in case of small natural energy, the driving force can be increased as much as possible and sufficient electric power generation can be realized.

In addition, a power supply unit of the present invention comprises a driving force generation means for generating driving force by converting natural energy into kinetic energy; an electric power generation means for generating electric power by being operated with the driving force; an energisation operation type clutch means for changing over with clutch force corresponding to operation current between transmission and interruption of the driving force from the driving force generation means to the electric power generation means; and a clutch control means for outputting the operation current to the clutch means with controlling the operation current such that the clutch force is increased in accordance with the driving force.

According to this feature, because the operation current to be supplied to the clutch means is controlled in accordance with the driving force, the consumption of the operation current can be decreased. In comparison with a case wherein a certain operation current continues to be supplied to the clutch means, the ratio of the electric power obtained by generation to the operation current used in the generation is improved. This realizes effective electric power generation.

BEST FORM FOR CARRYING OUT THE INVENTION (First Embodiment)

Hereinafter, a first embodiment of the present invention will be described with reference to FIGS. 1 to 10.

Figure 1:
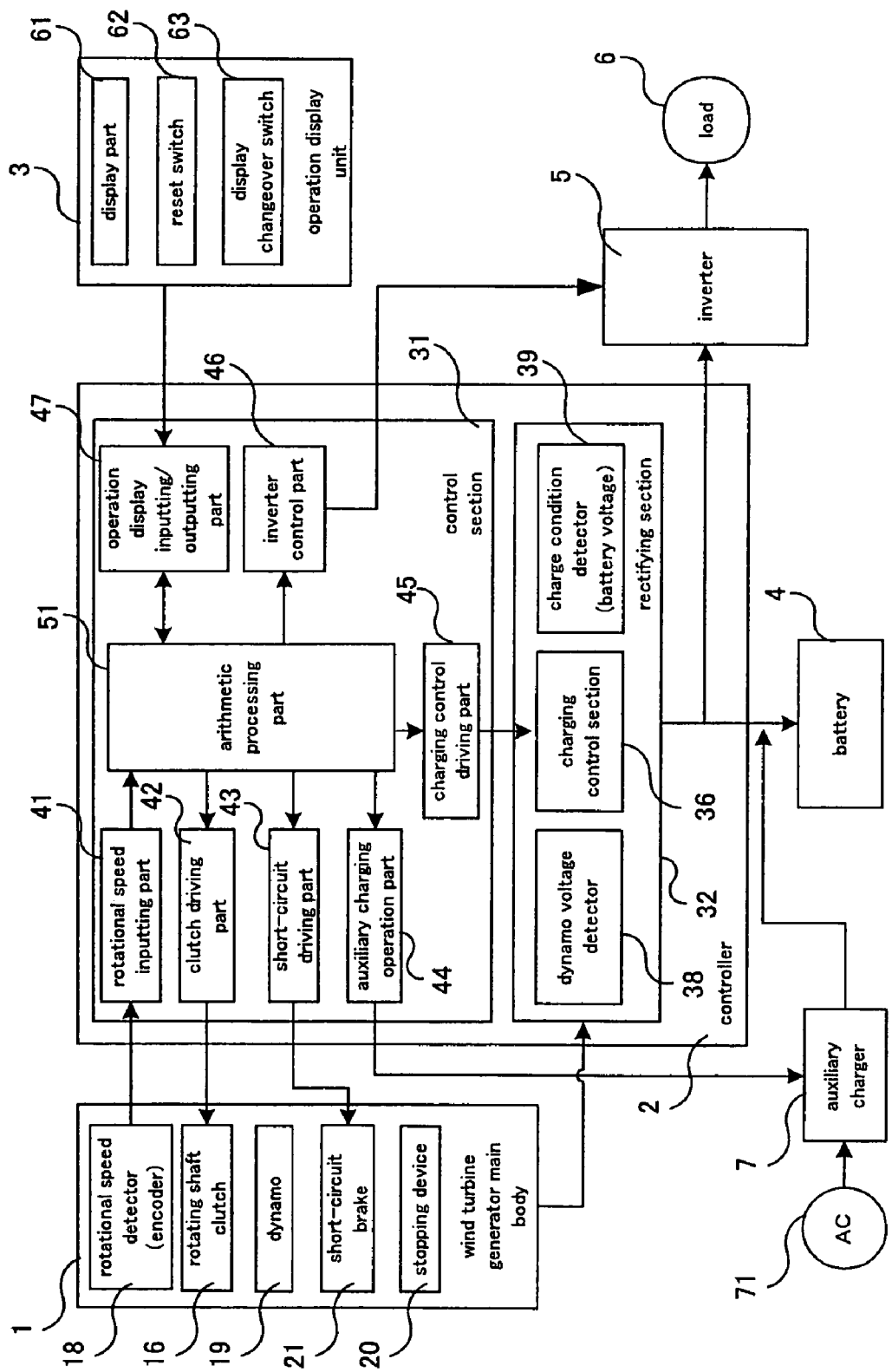
FIG. 1 is a block diagram of a wind turbine generator according to a first embodiment of the present invention.

As illustrated in FIG. 1, a power supply unit according to this embodiment is installed in a wind turbine generator. The wind turbine generator includes a wind turbine generator main body 1 for converting wind energy as a kind of natural energy into alternating electric power of electric energy to be output; a controller 2 having a function of controlling the wind turbine generator main body 1, a function of rectifying alternating electric power into direct electric power, etc.; an operation display unit 3 for displaying the operating condition, setting condition, etc., of the wind turbine generator; a battery 4 (storage means) to be charged with the direct electric power rectified by the controller 2; an inverter 5 (output means) for converting the electric power stored in the battery 4 into alternating electric power to be supplied to an external load 6; and an auxiliary charger 7 for supplying auxiliary electric power to the battery 4.

Figure 2:
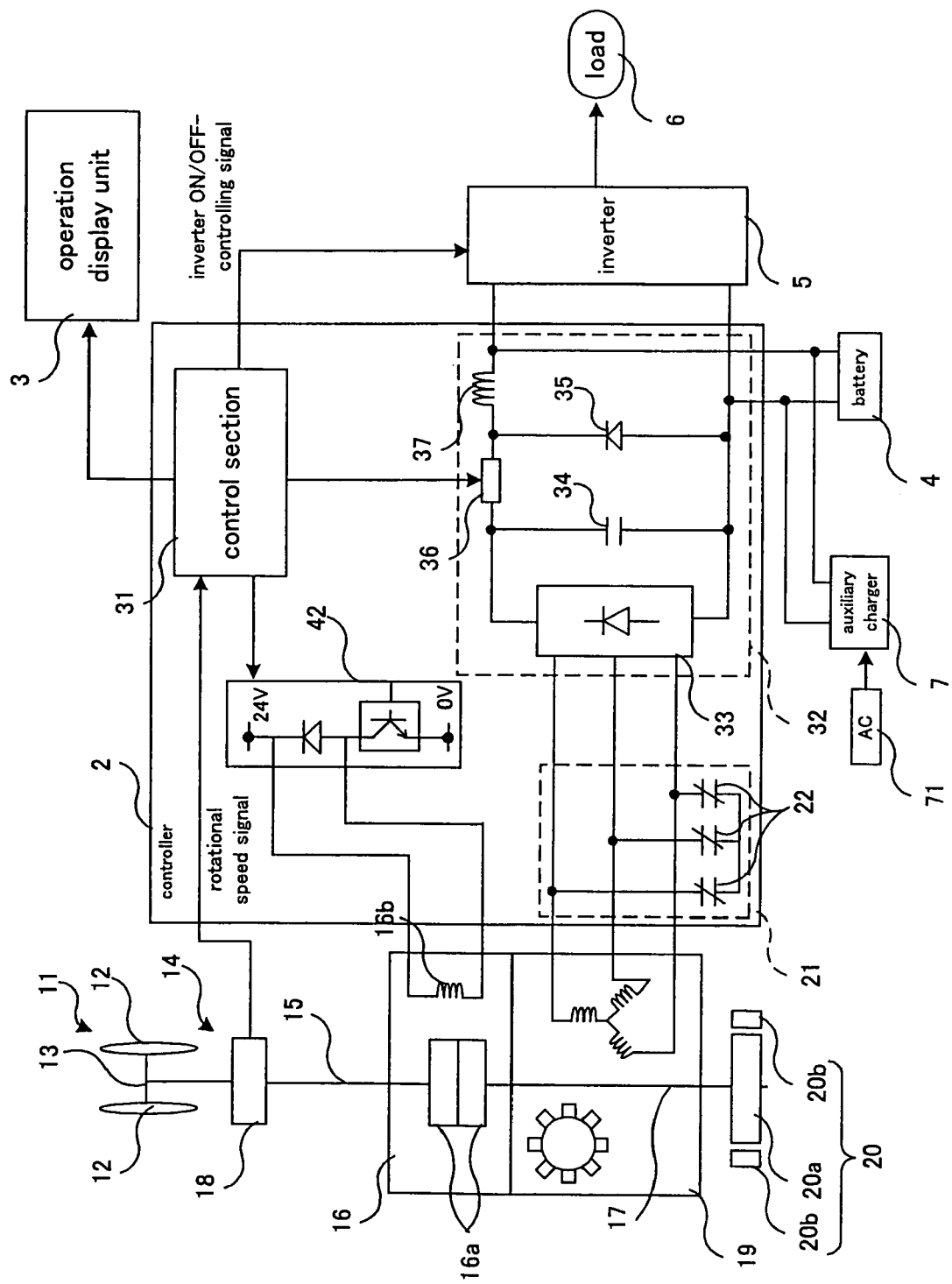
FIG. 2 is a diagram for explaining the whole construction of the wind turbine generator of FIG. 1.

As illustrated in FIG. 2, the above wind turbine generator main body 1 includes a wind turbine 11 (driving force generation means) for generating rotation driving force in accordance with wind power. The wind turbine 11 includes wind turbine blades 12 (rotation bodies) for receiving wind, a gyration support member 13 supporting the wind turbine blades 12 such that they can gyrate horizontally, and a rotation support mechanism 14 supporting the rotational center of the gyration support member 13. The rotation support mechanism 14 stands vertically. The rotation support mechanism 14 includes a first rotating shaft member 15 (rotating shaft) connected at its upper end to the rotational center of the gyration support member 13, and a second rotating shaft member 17 connected to the first rotating shaft member 15 through a rotating shaft clutch 16 (changeover means).

The above first rotating shaft member 15 is provided with a rotational speed detector 18 (measurement means/voltage detection means). The rotational speed detector 18 comprises an encoder, which outputs a rotational speed signal of the number of pulses in accordance with the rotational speed of the first rotating shaft member 15 (the number of revolutions per unit time). Alternatively, the rotational speed detector 18 may have a construction in which a detection object such as a magnet or a reflection plate is attached to a side face of the gyration support member 13 such that a rotational speed signal pulse is output every time when the detection object is detected.

The rotating shaft clutch 16 interposed between the rotating shaft members 15 and 17 is constructed into a deenergization operation type. More specifically, the rotating shaft clutch 16 includes two clutch plates 16a, a non-illustrated spring member for biasing the clutch plates 16a to be joined to each other, and a coil member 16b for generating electromagnetic force in the opposite direction to the biasing force of the spring member. Thus, when no clutch operation current is supplied, the clutch plates 16a are strongly joined (coupled) to each other by the biasing force of the spring to sufficiently transmit the rotation driving force of the first rotating shaft member 15 to the second rotating shaft member 17. When a clutch operation current is supplied, the electromagnetic force corresponding to the current value decreases the action of the biasing force to weaken the joint force between the clutch plates 16a. When the electromagnetic force exceeds the biasing force, the clutch plates 16a separate from each other.

In addition, a clutch driving part 42 (changeover control means/transmission inhibition means) of the controller 2 as will be described later separates or joins the clutch plates 16a of the rotating shaft clutch 16 in accordance with the rotational speed (hereinafter referred to as rotational speed N) detected by the rotational speed detector 18. More specifically, the rotational speed N is compared with a predetermined rotational speed (hereinafter referred to as rotational speed N1). When the rotational speed N is less than the rotational speed N1, the two clutch plates 16*a* are separated. That is, a clutch operation current is supplied to the rotating shaft clutch 16.

When the two clutch plates 16*a* are joined to each other to transmit the rotation driving force of the first rotating shaft member 15 to the second rotating shaft member 17, the load for operating a dynamo 19 is generated on the second rotating shaft member 17. Therefore, when the wind power is weak in comparison with the load, the first rotating shaft member 15 and the wind turbine blades 12 stop. Thus, when the rotational speed N is smaller than the rotational speed N1, the two clutch plates 16*a* are separated from each other so as not to transmit the load generated on the second rotating shaft member 17 to the first rotating shaft member 15, thereby preventing the first rotating shaft member 15 and wind turbine blades 12 from stopping.

In addition, when the rotational speed N increases after the two clutch plates 16*a* are separated from each other to rotate the wind turbine blades 12 without stopping, and the rotational speed N exceeds the rotational speed N1 and further a rotational speed N2, the two clutch plates 16*a* are again joined. That is, supply of the clutch operation current to the rotating shaft clutch 16 is stopped. Consequently, the load on the first rotating shaft member 15 and the wind turbine blades 12 disappear, the wind turbine blades 12 increases the rotational speed on the contrary, without stopping. Using the force of inertia that makes the rotation continue, the first rotating shaft member 15 and the wind turbine blades 12 can keep rotating without stopping even after the two clutch plates 16*a* are joined to each other.

By repeating the above-described operations alternately, even when the wind power weakens, the wind turbine blades 12 continue to rotate without stopping. The rotational speed N2 is obtained by adding a certain value to the rotational speed N1, and it is a rotational speed that makes it possible to generate a voltage not less than a voltage value (hereinafter referred to as charging voltage V) for charging the battery 4 as will be described later (see FIG. 10). When the voltage generated by the dynamo 19 is not more than the charging voltage V, the battery 4 is not charged.

The second rotating shaft member 17 to which the rotation driving force is transmitted through the above-described rotating shaft clutch 16, is provided with a dynamo 19 (electric power generation means) of, e.g., a three-phase alternating type. The dynamo 19 outputs alternating electric power in accordance with the rotational speed of the second rotating shaft member 17. A short-circuit brake 21 is connected to the output side of the dynamo 19. The short-circuit brake 21 includes short-circuit relay 22 connected to the respective terminals of the dynamo 19. Each short-circuit relay 22 makes a switch unit open by energizing from the controller 2, and makes the switch unit close when energizing from the controller 2 is stopped. Thereby, the short-circuit relay 22 short-circuit the output side of the dynamo 19 upon an abnormal condition such as a trouble of the controller 2. Thus, the short-circuit brake 21 generates a great load on the dynamo 19 to brake the rotation of the rotation support mechanism 14 by the wind turbine blades 12.

Further, a stopping device 20 for fixing the rotation support mechanism 14 by a manual operation is provided on the lower portion of the second rotating shaft member 17. The stopping device 20 includes an annular member 20*a* attached on the second rotating shaft member 17, and a pressing member 20*b* provided so as to be able to be brought into contact with and separated from the outer circumferential surface of the annular member 20*a*. Part of the pressing member 20*b* is set on a non-illustrated fixed portion such as a stand or the ground. When the pressing member 20*b* is pressed onto the annular member 20*a* by a manual operation, the stopping device 20 fixes the second rotating shaft member 17 by a great braking force, as a result, the rotation of the rotation support mechanism 14 is completely stopped. Alternatively, the stopping device 20 may be constructed such that it automatically operates in accordance with operation instructions from an operation display unit 3 as will be described later.

The wind turbine generator main body 1 constructed as described above is connected to the controller 2. As illustrated in FIG. 1, the controller 2 includes a control section 31 for controlling the wind turbine generator, and a rectifying section 32 for rectifying the alternating electric power output from the dynamo 19 of the wind turbine generator main body 1, into direct electric power. The control section 31 includes a rotational speed inputting part 41, a clutch driving part 42, and a short-circuit driving part 43. These parts 41 to 43 are connected to the rotational speed detector 18 and the rotating shaft clutch 16 of the wind turbine generator main body 1, and the short-circuit brake 21, respectively.

The rotational speed inputting part 41 has a function of converting the rotational speed signal from the rotational speed detector 18, into a signal form suitable for signal processing. The clutch driving part 42 has a function of outputting a clutch driving signal to the rotating shaft clutch 16 to control the operating condition of the rotating shaft clutch 16, that is, control the rotating shaft clutch 16 so as to weak or cancel the coupling force between the first and second rotating shaft members 15 and 17 of FIG. 2. The short-circuit driving part 43 has a function of outputting a driving signal to each short-circuit relay 22 of the short-circuit brake 21 upon a usual operation to fall the dynamo 19 in a short-circuit state upon an abnormal condition.

In addition, the controller 2 includes an auxiliary charging operation part 44, a charging control driving part 45, an inverter control part 46, and an operation display inputting/outputting part 47. The controller 2 further includes an arithmetic processing part 51 for monitoring and controlling the respective parts 41 to 47. Details of the arithmetic processing part 51 will be described later.

Figure 3:
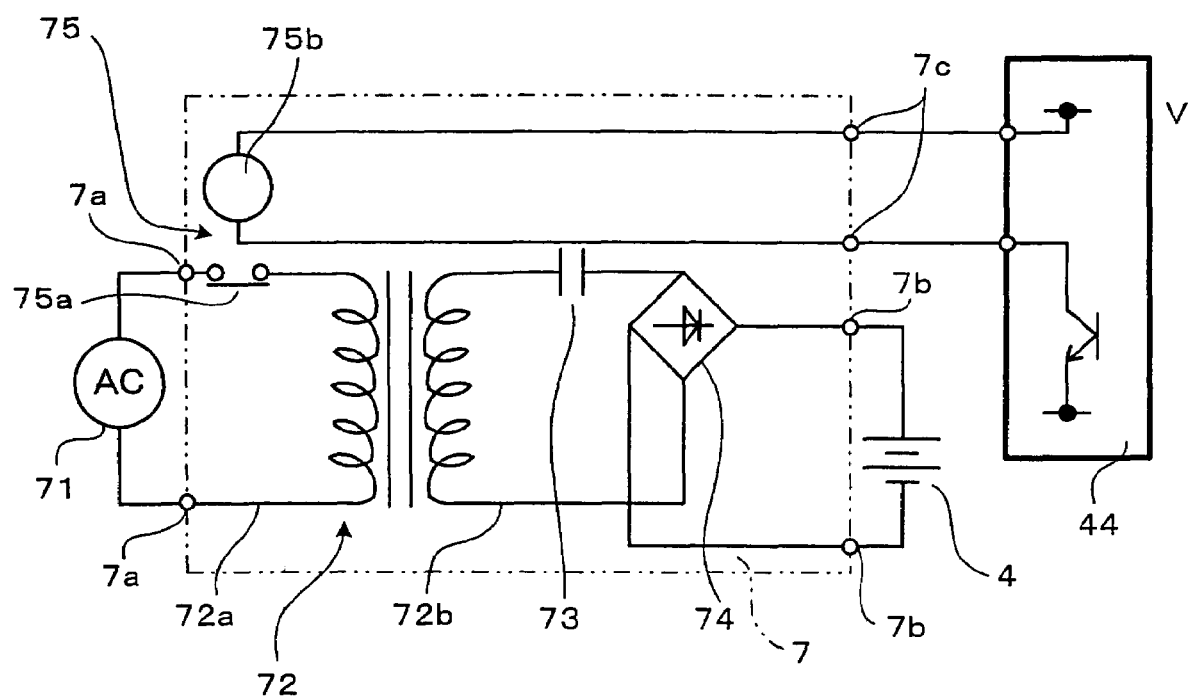
FIG. 3 is a block diagram of an auxiliary charger.

The above auxiliary charging operation part 44 is connected to the auxiliary charger 7 called DC power pack for charging the battery 4 with auxiliary electric power. As illustrated in FIG. 3, the auxiliary charger 7 is integrally provided by being mounted on a single board or being accommodated in a casing. The auxiliary charger 7 is provided with a power supply input terminal 7*a*, a power supply output terminal 7*b*, and a signal input terminal 7*c*. A commercial or industrial power supply 71 is detachably connected to the power supply input terminal 7*a*. The battery 4 is detachably connected to the power supply output terminal 7*b*. The auxiliary charging operation part 44 is detachably connected to the signal input terminal 7*c*.

The primary coil 72*a* of a transformer 72 is connected to the above power supply input terminal 7*a*. The secondary coil 72*b* of the transformer 72 is provided with a capacitor 73 for regulating current, and a bridge diode 74 for full-wave rectification of voltage changing in an alternating state. The bridge diode 74 is connected at its cathode to the positive electrode of the battery 4 through the power supply output terminal 7b and at its anode to the negative electrode of the battery 4 through the power supply output terminal 7b. Thus, the auxiliary charger 7 has a function that is changing the alternating electric power from the power supply 71 into a predetermined voltage by transformer 72 and then charging the battery 4.

In addition, the auxiliary charger 7 includes an auxiliary power supply relay 75. The auxiliary power supply relay 75 includes a switch 75a provided so as to form part of a current path of the primary coil 72a, and a coil 75b for opening and closing the switch 75a. The switch 75a is set such that the switch 75a is open when the coil 75b is energized. The coil 75b is connected to the auxiliary charging operation part 44 through the signal input terminal 7c. Thus, the auxiliary charger 7 has a function of being able to switch between carrying-out and stopping of auxiliary charging of the battery 4 in accordance with an operation signal from the auxiliary charging operation part 44.

As illustrated in FIG. 1, the battery 4 to be auxiliary-charged by the above-described auxiliary charger 7 is connected also to the rectifying section 32 of the controller 2. The rectifying section 32 is so constructed as to convert the alternating electric power from the dynamo 19 of the wind turbine generator main body 1 into direct electric power and charge the battery 4 with the direct electric power.

That is, as illustrated in FIG. 2, the rectifying section 32 includes a bridge diode 33 connected to the dynamo 19; a charging capacitor 34 connected in parallel to the anode and cathode of the bridge diode 33; a diode 35 connected to the bridge diode 33 downstream of the charging capacitor 34 in the same direction of the bridge diode 33; a charging control section 36 provided between the charging capacitor 34 and the diode 35 for controlling to switch between passing and interrupting of current; and a coil 37 provided downstream of the diode 35. The above charging control section 36 comprises a semiconductor switch such as a transistor. The charging control section 36 is connected to the charging control driving part 45 of FIG. 1. The charging control driving part 45 outputs a charging control signal to control the time of energizing from the bridge diode 33 to the diode 35. The rectifying section 32 constructed as described above is connected to the battery 4 and the inverter 5. The rectifying section 32 charges the battery 4 with electric power of a charging voltage in accordance with the energizing time controlled by the charging control section 36.

The above charging control section 36 comprises a semiconductor switch such as a transistor. The charging control section 36 is connected to the charging control driving part 45 of FIG. 1. The charging control driving part 45 outputs a charging control signal to control the time of energizing from the bridge diode 33 to the diode 35. The rectifying section 32 constructed as described above is connected to the battery 4 and the inverter 5. The rectifying section 32 charges the battery 4 with electric power of a charging voltage in accordance with the energizing time controlled by the charging control section 36.

As illustrated in FIG. 1, the rectifier section 32 includes a dynamo voltage detector 38 for detecting the dynamo voltage of the alternating electric power input from the dynamo 19; and a charge condition detector 39 (stored electric power detection means) for detecting a charging voltage, i.e., battery voltage, and charging current for charging the battery 4 and a charging voltage stored in the battery 4. The rotational speed of the rotation support mechanism 14 also shows a change in voltage of the electric power generated by the dynamo 19. That is, upon usual generation, it is substantially the same as the dynamo voltage detected by the dynamo voltage detector 38. These detectors 38 and 39 are connected to the arithmetic processing part 51. Each of the voltage detectors 38 and 39 outputs a detected voltage to the arithmetic processing part 51.

The inverter control part 46 connected to the arithmetic processing part 51 like the above-described charging control driving part 45 is connected to the inverter 5. The inverter 5 has an output function of converting the direct electric power stored in the battery 4 into domestic alternating electric power for example, and outputting the alternating electric power to the external load 6, and a function of switching between the operation and stop of the output function in accordance with a signal from the inverter control part 46.

Further, the operation display inputting/outputting part 47 connected to the arithmetic processing part 51 is detachably connected to the operation display unit 3.

Figure 4:
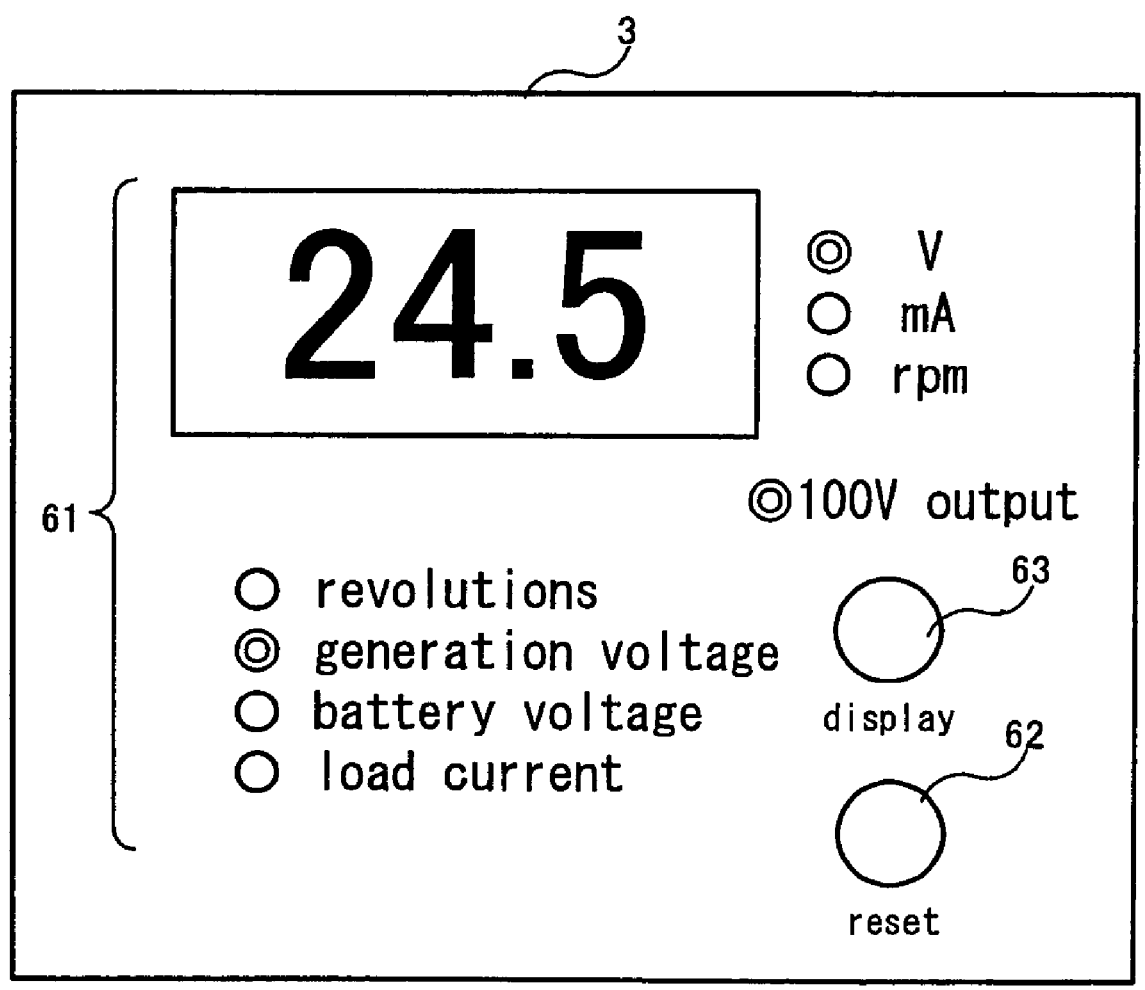
FIG. 4 is an external view of an operation display unit 3 illustrated in FIG. 1.

The operation display unit 3 will be described here. As illustrated in FIG. 4, the operation display unit 3 includes a display part 61 such as seven-segment LEDs or an LCD, a reset switch 62, and a display changeover switch 63 (operation means). The display unit 61 is designed such that operating conditions of the wind turbine generator can be shown with characters or numerical values. The operating conditions include the rotational speed of the rotation support mechanism 14, i.e., wind speed, obtained through the rotational speed inputting part 41, the dynamo voltage detected by the dynamo voltage detector 38, the charging voltage, i.e., the battery voltage, detected by the charge condition detector 39, and operating conditions of each of other units. The reset switch 62 is for resetting the operation display unit 3.

The display changeover switch 63 set the display of operating conditions on the display unit 61 to be changeable by manual operation.

Figure 7:
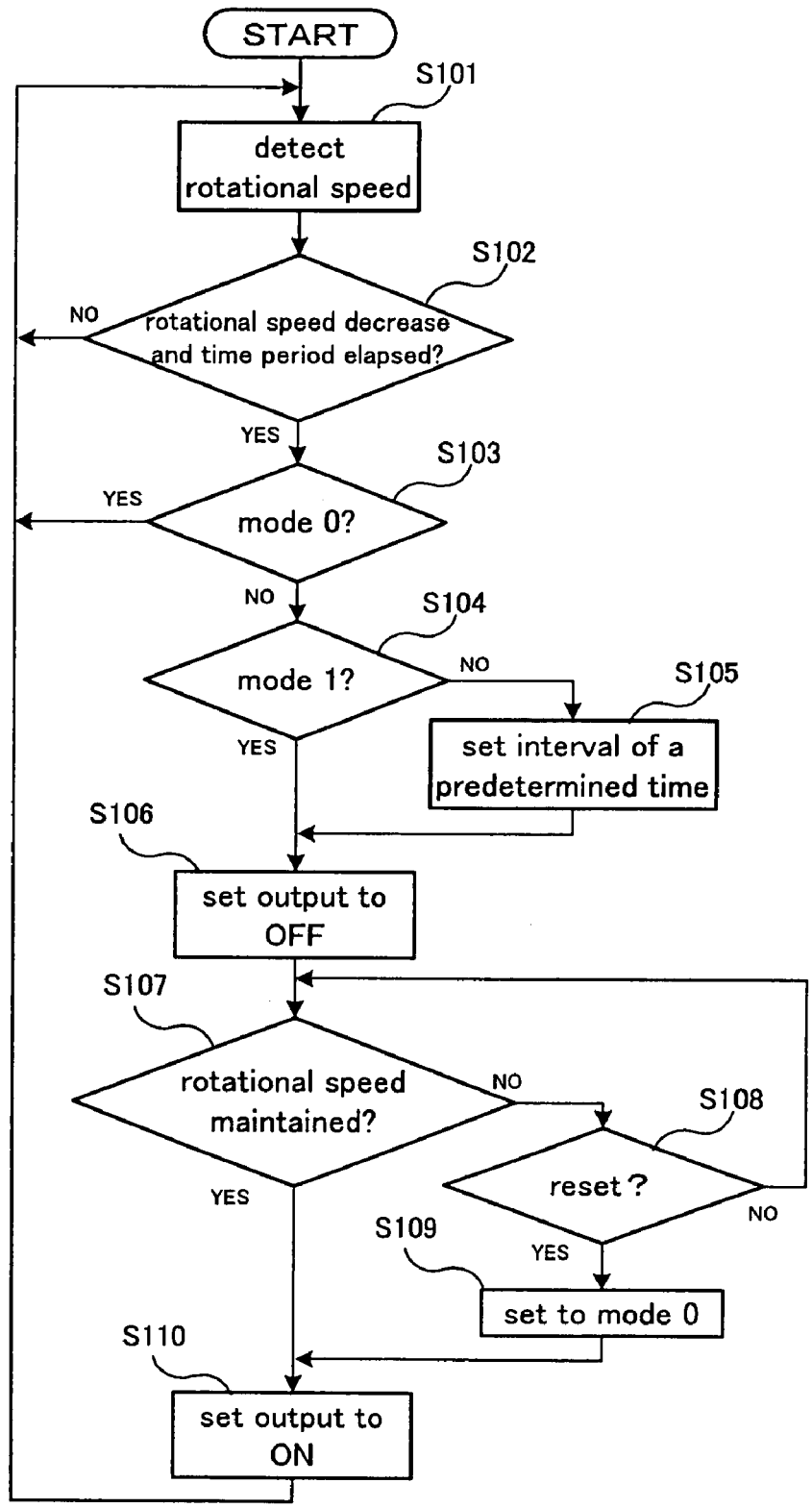
FIG. 7 is a flowchart of an operation procedure of a battery protection function by a control part illustrated in FIG. 1.

The operating conditions to be displayed include the rotational speed of the rotation support mechanism 14 (revolutions per minute in the figure), dynamo voltage (generation voltage in the figure), charging voltage (battery voltage in the figure), and load current as electric current being supplied to the external load 6, detected by the inverter 5. These operating conditions are displayed on the display part 61 in order with being changed over every time when the display changeover switch 63 is depressed. In FIG. 7, the dynamo voltage is being displayed. In addition, a condition that 100 V output to the external load 6 is ensured is indicated (100 V output in the figure).

In addition, the display changeover switch 63 set a normal mode (mode 0) wherein the output of the inverter 5 is always kept, a save mode (mode 1) wherein the inverter control part 46 stops the output of the inverter 5 when the rotational speed of the rotation support mechanism 14 is not more than a set value, and an interval save mode (mode 2) wherein the inverter control part 46 stops the output of the inverter 5 when a certain time period has elapsed after the rotational speed of the rotation support mechanism 14 is not more than the set value, to be changeable by manual operation. By depressing the display changeover switch 63 for a long time of 5 seconds or more, the modes are changed over in order. The set contents are stored in a non-illustrated memory.

The operation display unit 3 includes a control part comprising an arithmetic part, a memory, and so on, which are not illustrated. In addition to a function of controlling the operation display unit 3 itself, the control part has a function of communication with the controller 2, in the form of a program. Alternatively, each function in the operation display unit 3 may be realized by the form of hardware in place of the form of software.

Likewise, the arithmetic processing part 51 of the controller 2 includes an arithmetic part and a memory, which are not illustrated, and has various functions for controlling the wind turbine generator, in the form of programs.

The arithmetic processing part 51 has an auxiliary charging processing function, an abnormal operation braking function, a rotation accelerating function, a low-voltage charging function, a battery protecting function, and so on. The auxiliary charging processing function is a function of monitoring the charging voltage detected by the charging condition detector 39 and permitting the auxiliary charger 7 to charge the battery 4 with auxiliary electric power when the charging voltage is less than a first predetermined value. The abnormal operation braking function is a function of energizing the short-circuit relay 22 of the short-circuit brake 21 to be open upon a normal operation so that the alternating electric power of the dynamo 19 can be supplied to the bridge diode 33, and short-circuiting the output of the dynamo 19 to generate braking force on the dynamo 19 when energizing is stopped because of an abnormal operation. The rotation accelerating function is a function of releasing the coupling state of the rotating shaft clutch 16 so that only the first rotating shaft member 15 can be rotated, when the rotational speed of the rotation support mechanism 14 is less than a second predetermined value because of a decrease in wind power, and restoring the coupling state of the rotating shaft clutch when the rotational speed of the first rotating shaft member 15 is increased to not less than a certain value. The low-voltage charging function is a function of performing charging control for switching the charging control section 36 between the ON state and OFF state when the rotational speed of the rotation support mechanism 14 is not less than a third predetermined value, and keeping the charging control section 36 in the ON state when the rotational speed has lowered to less than the third predetermined value. The battery protecting function is a function for preventing the battery 4 from being over discharged. It is a function of ON/OFF-controlling the power output unit of the inverter 5 on the basis of the rotational speed of the rotation support mechanism 14 in accordance with each operation mode stored in the memory.

Operations of the wind turbine generator of the above-described construction will be described.

Upon general operation stop, as illustrated in FIG. 2, energizing to the deenergization operation type rotating shaft clutch 16 is stopped so that the rotating shaft clutch 16 falls in a strong coupling state. Thereby, the first rotating shaft member 15 and the second rotating shaft member 17 of the rotation support mechanism 14 are united by the rotating shaft clutch 16. In addition, energizing to the short-circuit relay 22 of the short-circuit brake 21 is stopped so that the dynamo 19 falls in a short-circuit state. Thereby, the dynamo 19 is in a state that the operation of the dynamo 19 requires a large load. As a result, even when a large rotation driving force is applied to the rotation support mechanism 14 by a wind, as the rotation support mechanism 14 rotates the dynamo 19 at a high speed to be operated, a heavy load acts as a braking force to the rotation of the rotation support mechanism 14, so that a high-speed rotation of the rotation support mechanism 14 is inhibited.

Further, upon a special operation stop such as a strong wind or inspection, a braking force in the stopping device 20 is generated. Thereby, the second rotating shaft member 17 of the rotation support mechanism 14 is fixed so that the rotation of the rotation support mechanism 14 is completely stopped.

Next, upon an operation, after the operation display unit 3 is connected to the controller 2 at need, the controller 2 and the operation display unit 3 are powered on. In the controller 2, energizing the rotating shaft clutch 16 is started. Thereby, the coupling state of the rotating shaft clutch 16 is released so that the first rotating shaft member 15 is separated from the second rotating shaft member 17. As a result, the first rotating shaft member 15 is in a state of being rotatable relative to the second rotating shaft member 17. Thus, even when only a weak wind strikes the wind turbine blades 12, the first rotating shaft member 15 can rapidly increase in its rotational speed. In addition, the short-circuit state of the dynamo 19 is released by energizing the short-circuit brake 21 so that the alternating electric power generated by the dynamo 19 can be supplied to the controller 2. On the other hand, in the operation display unit 3, an operating condition of the control section 31, that is, the rotational speed of the first rotating shaft member 15 for example is displayed with a numerical value or the like.

Next, the controller 2 operates such that the arithmetic processing part 51 effects the auxiliary charging processing function, the abnormal operation braking function, the rotation accelerating function, the low-voltage charging function, the battery protecting function, and so on.

(Rotation Accelerating Function)

Figure 5:
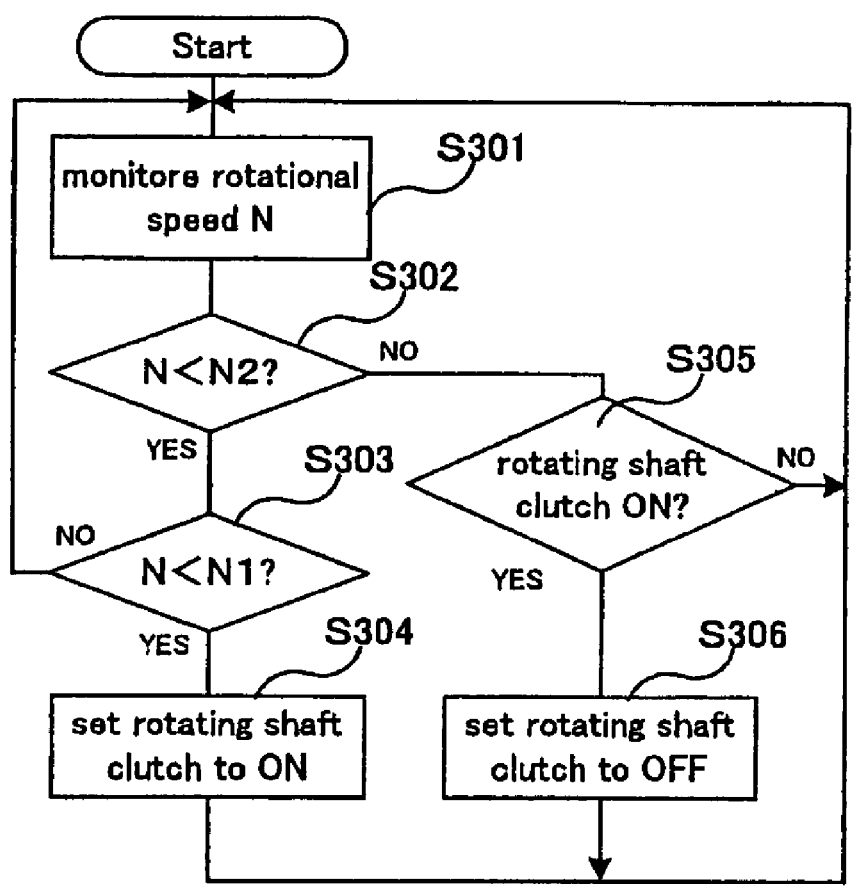
FIG. 5 is a flowchart of a rotating shaft clutch operation.

First, the rotation accelerating function will be described with reference to FIG. 5. In S301 of FIG. 5, the rotational speed N of the first rotating shaft member 15 is monitored. The flow then advances to S302, wherein it is judged whether or not the rotational speed N is less than a rotational speed N2. When the rotational speed N is less than the rotational speed N2 (S302: Yes), the flow advances to S303, wherein it is judged whether or not the rotational speed N is less than a rotational speed N1. When the rotational speed N is less than the rotational speed N1 (S303: Yes), that is, when the wind is weak, the flow advances to S304, wherein the rotating shaft clutch is set ON. That is, clutch operation current is supplied to the rotating shaft clutch 16 so that the clutch plates 16a are separated from each other. As a result, because the first rotating shaft member 15 rotates under no load condition, it can rotate even upon a weak wind. Afterward, the flow returns to S301.

When the rotational speed N is not less than the rotational speed N1 (S303: No), that is, when the wind is not weak, the flow returns to S301. When the rotational speed N is not less than the rotational speed N2 (S302: No), the flow advances to S305, wherein it is judged whether or not the rotating shaft clutch 16 is ON. When the rotating shaft clutch 16 is ON (S306: Yes), the rotating shaft clutch 16 is set OFF. That is, the supply of the clutch operation current to the rotating shaft clutch 16 is stopped so that the clutch plates 16a are joined to each other. Even when the clutch plates 16a are joined to each other, because the inertia of the first rotating shaft member 15 acts, the rotation support mechanism 14 in which the first and second rotating shaft members 15 and 17 are united rotates at a relatively high speed. When the rotating shaft clutch 16 is not ON (S306: No), the flow returns to S301.

Figure 10:
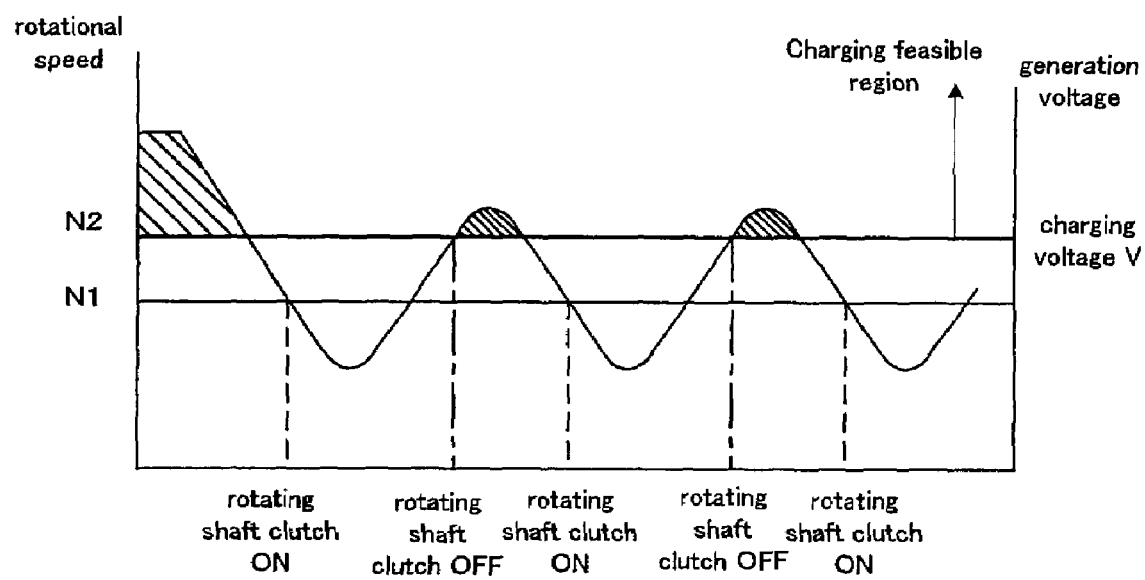
FIG. 10 is a graph showing changes in the rotational speed of a rotation support mechanism and in the voltage generated by the wind turbine generator.

That is, when the wind is weak, the rotational speed of the rotation support mechanism 14 decreases due to the load for operating the dynamo 19. In this case, if the dynamo voltage that the dynamo 19 generates by the rotation of the rotation support mechanism 14 is lower than the charging voltage V of the battery 4, the battery 4 can not be charged. Therefore, as illustrated in FIG. 10, when the rotational speed N has decreased to less than the rotational speed N1, the coupling state of the rotating shaft clutch 16 is released by energizing the rotating shaft clutch 16 so that only the first rotating shaft member 15 can rotate. Thus, the first rotating shaft member 15 is in a state of being able to be accelerated in a short time even upon a weak wind. When the rotational speed N has increased to not less than the rotational speed N2, that is, when it has reached a rotational speed at which a voltage of not less than the charging voltage that can charge the battery 4 can be generated, the coupling state of the rotating shaft clutch 16 is restored to restart the generation by the dynamo 19. Thereby, even in case of a weak wind, alternating electric power of a high voltage can be intermittently supplied to the controller 2.

(Low-Voltage Charging Function)

The alternating electric power supplied to the controller 2 as described above is full-wave-rectified in the bridge diode 33 and then smoothed by a smoothing circuit made up of a charging capacitor 34, a diode 35, and a coil 37, to be stored in the battery 4. The electric power stored in the battery 4 is used as the power supply of the controller 2. In addition, the electric power is converted into alternating electric power by the inverter 5 to be used as the power supply of the external load 6.

Figure 6:
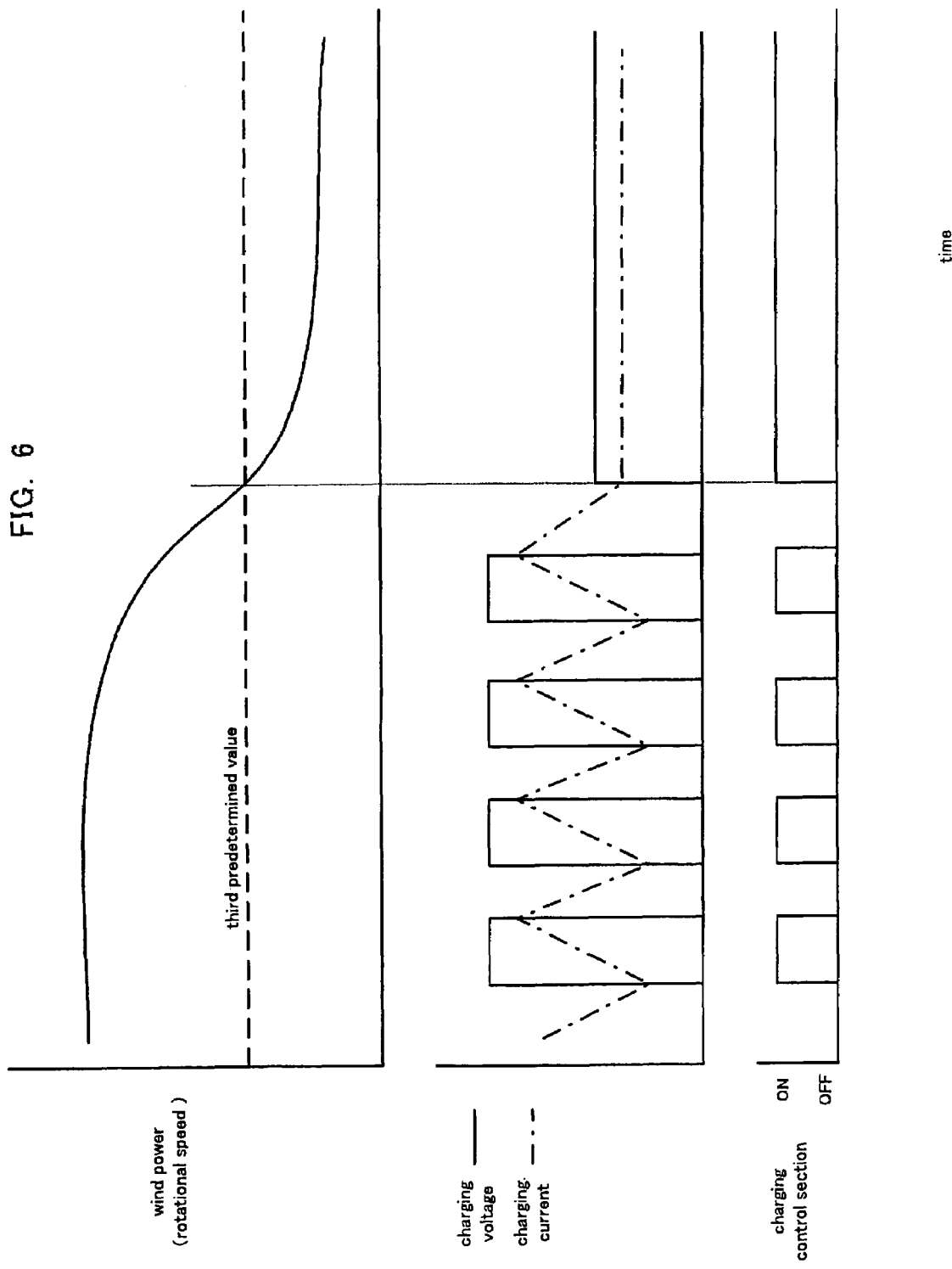
FIG. 6 shows graphs for explaining a state of charging a battery.

Upon this, as shown in FIG. 6, the charging voltage and charging current for charging the battery 4 are controlled by the charging control section 36. That is, when the rotational speed of the rotation support mechanism 14 is not less than the third predetermined value, the battery 4 is judged to be charged with a charging voltage considerably higher than the rated voltage of the battery 4. Thus, charging control is done in which the charging control section 36 is switched between the ON state and the OFF state so as to lower the charging voltage.

That is, when the charging voltage is judged to be not less than the third predetermined value because of strong wind power, supply of electric power to the battery 4 (ON state of the charging control section 36) and stop of the supply (OFF state of the charging control section 36) are repeated. In the ON state of the charging control section 36, large discharge current corresponding to the electric power stored in the charging capacitor of FIG. 2 is supplied as charging current to the battery 4. On the other hand, in the OFF state of the charging control section 36, small current flowing in a closed circuit comprising the coil 37 and the diode 35 is supplied as charging current to the battery 4. As a result, under a high charging voltage of not less than the third predetermined value, the battery 4 is charged with charging current being throttled.

On the other hand, when the rotational speed has decreased to less than the third predetermined value, the battery 4 is judged to be charged with a charging voltage near the rated voltage of the battery 4. Thus, charging control is done to keep the charging control section 36 in the ON state so that the battery 4 is charged with charging current as large as possible.

That is, when the charging voltage is judged to be less than the predetermined value because of a weak wind power, supply of electric power to the battery 4 (ON state of the charging control section 36) is continued. Thus, the whole current rectified by the bridge diode 33 is supplied as charging current to the battery 4. As a result, under a low charging voltage, the battery is charged with charging current as large as possible.

(Auxiliary Charging Processing Function)

As illustrated in FIG. 1, while the battery 4 is charged, the charging voltage detected by the charging condition detector 39 is monitored. When the charging voltage has decreased to less than the first predetermined value, charging the battery 4 with auxiliary electric power by the auxiliary charger 7 is permitted.

That is, as illustrated in FIG. 3, when the charging voltage is not less than the first predetermined value, the switch 75*a* is set to an open state by energizing the auxiliary power supply relay 75 so that auxiliary charging the battery 4 is inhibited. On the other hand, when the charging voltage has decreased to less than the first predetermined value, the charging voltage of the battery 4 (battery voltage) is judged to considerably lower. Thus, energizing the auxiliary power supply relay 75 is stopped. The auxiliary power supply relay 75 stopped to be energized changes over the switch 75*a* from the open state to the close state. Thereby, the alternating electric power from the power supply 71 is supplied to the transformer 72. After the electric power is changed into a predetermined voltage by the transformer 72, auxiliary electric power made into constant current by the capacitor 73 is generated. Auxiliary charging the battery 4 is performed with the auxiliary electric power. The charging current to the battery 4 is determined by I omega CE, where omega=2 pi f, C represents the capacitance microfarad of the capacitor 73, and E represents the charging voltage. In addition, even when the controller 2 can not operate as a result of the charging voltage of the battery 4 having extremely lowered, because energizing the auxiliary power supply relay 75 is stopped, auxiliary charging the battery 4 by the auxiliary charger 7 is performed.

(Abnormal Operation Braking Function)

As illustrated in FIG. 2, when the wind turbine generator is in normal operation, the short-circuit relay 22 of the short-circuit brake 21 is energized to be open. The alternating electric power from the dynamo 19 is supplied to the rectifying section 32 of the bridge diode 33 and so on to charge the battery 4. On the other hand, when the controller 2 is brought into an emergency stop because of an abnormal condition such as wear or damage of parts, all signal outputs being output to the wind turbine generator main body 1 and so on are stopped. As a result, because energizing the short-circuit relay 22 of the short-circuit brake 21 is stopped, the dynamo 19 is brought into a short-circuited state.

When energizing the rotating shaft clutch 16 is stopped, the clutch plates 16*a* are brought into a strongly coupled state because the rotating shaft clutch 16 is a deenergization operation type. Thereby, the first rotating shaft member 15 and the second rotating shaft member 17 of the rotation support mechanism 14 are united by the rotating shaft clutch 16. Thus, the rotational speed of the rotation support mechanism 14 is rapidly decreased due to the heavy load by the dynamo 19 in the short-circuited state.

(Battery Protecting Function)

As described before, the battery protecting function has three modes, i.e., the normal mode, the save mode, and the interval save mode. These are set by the display changeover switch 63 of the operation display unit 3. When the battery protecting function is set to the normal mode (mode 0), the output of the inverter 5 is always maintained. In a state of the battery 4 having been over discharged, the output of the inverter 5 is stopped. When the battery protecting function is set to the save mode (mode 1), the inverter control part 46 stops the output of the inverter 5 if the rotational speed of the rotation support mechanism 14 is not more than a set value, for example, 50 rpm. When the battery protecting function is set to the interval save mode (mode 2), the inverter control part 46 stops the output of the inverter 5 if the rotational speed of the rotation support mechanism 14 is not more than a set value, for example, 50 rpm, and a predetermined time period, for example, one hour, has elapsed. In the save mode and the interval save mode, after the output of the inverter 5 is stopped, the output of the inverter 5 is restarted by keeping not less than the rotational speed (for example, 50 rpm) of the rotation support mechanism 14 for a predetermined time, for example, five minutes, by a certain wind power. When the battery 4 has been fully charged, the output of the inverter 5 is maintained. At this time, the rotational speed of the rotation support mechanism 14 is detected as a voltage reference of the electric power to be generated by the dynamo 19. Therefore, not the rotational speed of the rotation support mechanism 14 but the dynamo voltage may be detected, or the charging voltage may be detected.

Next, the operation procedure of the battery protecting function will be described with reference to the flowchart of FIG. 7. The flow advances to Step S101, wherein the rotational speed detector 18 detects the rotational speed of the rotation support mechanism 14. The charging voltage of the battery 4 is determined by the rotational speed of the rotation support mechanism 14. Afterward, the flow advances to Step S102, wherein it is judged whether or not a time period of one hour or more has elapsed in a state that the rotational speed of the rotation support mechanism 14 is 0 to 50 rpm. When the time period of one hour or more is judged not to have elapsed in the state that the rotational speed of the rotation support mechanism 14 is 0 to 50 rpm (S102: NO), the flow again advances to Step S101 and then the above-described procedure is repeated. When the time period of one hour or more is judged not to have elapsed in the state that the rotational speed of the rotation support mechanism 14 is 0 to 50 rpm (S102: YES), the flow advances to Step S103.

In Step S103, it is judged whether or not the mode set in the memory is the normal mode (mode 0). When the set mode is judged to be the normal mode (mode 0) (S102: YES), the output of the inverter 5 is maintained without any change and the flow again advances to Step S101. When the set mode is judged not to be the normal mode (mode 0) (S102: NO), the flow advances to Step S104, wherein it is judged whether or not the set mode is the save mode (mode 1). When the set mode is judged to be the save mode (mode 1) (S104: YES), the flow advances to Step S106, wherein the output of the inverter 5 is immediately stopped. When the set mode is judged not to be the save mode (mode 1) (S104: NO), then the set mode is judged to be the interval save mode (mode 2) and the flow advances to Step S105, wherein an interval of a predetermined time is set. Afterward, the flow advances to Step S106, wherein the output of the inverter 5 is stopped.

Afterward, the flow advances to Step S107, wherein it is judged whether or not a time period of five minutes or more has elapsed in a state that the rotational speed of the rotation support mechanism 14 is not less than 50 rpm. When the time period of five minutes or more is judged to have elapsed in the state that the rotational speed of the rotation support mechanism 14 is not less than 50 rpm (S107: YES), the flow advances to Step S110. When the time period of five minutes or more is judged not to have elapsed in the state that the rotational speed of the rotation support mechanism 14 is not less than 50 rpm (S107: NO), the flow advances to Step S108, wherein it is judged whether or not a user has performed a reset operation. The reset operation means an operation of depressing the reset switch 62 of the operation display unit 3. When the user is judged not to have performed the reset operation (S108: NO), the flow again advances to Step S107. When the user is judged to have performed the reset operation (S108: YES), the flow advances to Step S110. In Step S110, the operation mode is set to the mode 0 and the output of the inverter 5 is set ON. Afterward, the flow again advances to Step S101.

As described above, the power supply unit of this embodiment includes the battery 4 (storage means) for storing electric power that is used for operations of various devices, charging means (the dynamo 19, the rotation support mechanism 14, and the rectifying section 32) for converting natural energy into electric energy and supplies electric power of the electric energy to the battery 4 to be charged, the charging control section 36 (charging changeover means) for changing over between supply and stop of the electric power from the charging means to the battery 4, and charging changeover control means (the charging control driving part 45, and the low-voltage charging function of the arithmetic processing part 51) for converting the charging control section 36 such that supply and stop of the electric power are repeated when the charging voltage for charging the battery 4 with electric power is not less than the third predetermined value, and continues supply of the electric power when the charging voltage is less than the third predetermined value.

Here, various devices of the external load 6 include electric devices such as the controller 2 of the wind turbine generator and a refrigerator of the external load 6; light and heat devices such as electric lights and air conditioners; and so on. The natural energy includes any energy existing in the natural world, such as wind power, a solar cell, water power, and wave power.

According to the above construction, when the charging voltage for charging the battery 4 is not less than the third predetermined value because of large natural energy, supply and stop of electric power to the battery 4 are repeated and thereby the battery 4 is charged with charging current being throttled under a high charging voltage. On the other hand, when the charging voltage for charging the battery 4 is less than the third predetermined value because of small natural energy, by continuing supply of electric power to the battery 4, the battery 4 is charged with charging current as large as possible under a low charging voltage. Therefore, even in case that the charging voltage may change widely due to increase/decrease of the natural energy, the battery 4 can be efficiently charged.

In addition, an electric power supply of the present embodiment includes the battery 4 (storage means) for storing electric power that is used for operations of various devices, charging means (the dynamo 19, the rotation support mechanism 14, and the rectifying section 32) for converting natural energy into electric energy and supplies electric power of the electric energy to the battery 4 to be charged, the auxiliary charger 7 (auxiliary charging means) for charging the battery 4 with auxiliary electric power, and charging control means (an auxiliary charging operation part 44 and the low-voltage charging function of the arithmetic processing part 51) for monitoring the charging voltage of the battery 4 and permitting that the auxiliary charging means charge auxiliary electric power to the battery 4 when the charging voltage is less than a predetermined value.

According to the above construction, because the auxiliary charger 7 charges the battery 4 with auxiliary electric power when the charging voltage of the battery 4 has lowered to less than a predetermined value, the charging voltage of the battery 4 is always kept to the charging voltage of not less than the predetermined value. Thereby, a trouble can be prevented in which various devices such as the controller 2 erroneously operate or can not operate due to electric power of a too low voltage. In addition, the battery 4 can be prevented from being over discharged, besides a trouble of operation stop of the controller 2 can be prevented. As a result, when a wind turbine generator provided with this power supply unit is used, because the battery 4 can be surely charged even in a area where the wind is weak, the wind turbine generator can be operated with high reliability.

In addition, as illustrated in FIG. 3, the auxiliary charger 7 of this embodiment comprises the power supply 71 (auxiliary power supply means) that outputs auxiliary electric power of direct current of a predetermined voltage, and the auxiliary power supply relay 75 (changeover means) in which supply and stop of auxiliary electric power to the battery 4 can be changed over by the charging control means. Thus, the auxiliary charger 7 of the power supply unit can be easily constructed.

As illustrated in FIG. 2, the power supply unit further comprises the battery 4 (storage means) for storing electric power that is used for operations of various devices outputted from the bridge diode 33. Thus, the battery 4 can efficiently charge a high even in case of small natural energy.

In addition, a wind turbine generator comprises a power supply unit as described above. According to this feature, the wind turbine generator can be efficiently operated in an environment that wind power may change widely According to the above construction, even under conditions of a weak wind, by alternately repeating transmission and interruption of the wind energy to the dynamo 19, the generation efficiency of the dynamo 19 can be improved. In case of a weak wind, because some load is applied to the rotation support mechanism 14 due to the dynamo 19 when the wind power is transmitted to the dynamo 19, there is a fear that the rotation support mechanism 14 is stopped.

By separating the first and second rotating shaft members 15 and 17 from each other by the rotating shaft clutch 16, the above load can be prevented from being transmitted to the first rotating shaft member 15. Therefore, the first rotating shaft member 15 and the wind turbine blades 12 continue to rotate without stopping. Further, there can be made a state that the rotational speed can raise. By using the force of inertia at this time, a rotation driving force larger than the generated load can be obtained even when the clutch operation current to the rotating shaft clutch is interrupted to couple the first and second rotating shaft members 15 and 17 to each other. Therefore, the first rotating shaft member 15 and the wind turbine blades 12 can rotate without stopping. By repeating this operation, generation of electric power can be done without stopping. In addition, the rotation driving force can thereby be raised as much as possible. Thus, even in case of a weak wind, the dynamo 19 can sufficiently generate electric power.

In addition, when the rotational speed N of the wind turbine blades 12 is more than the rotational speed N2, the rotation clutch is operated to couple the clutch plates 16a to each other. Thereby, the wind turbine blades 12 are rotated till a required rotation driving force is obtained, that is, the rotational speed of the wind turbine blades 12 reaches a rotational speed at which a voltage not less than the charging voltage for charging the battery 4 can be generated. Thus, the dynamo 19 can efficiently generate electric power. Further, because wind power as a kind of natural energy is converted into rotation driving force with the wind turbine 11, because the magnitude of the driving force is measured from the rotational speed of the wind turbine blades 12, it can be constructed in a simple structure in comparison with another construction.

According to the above construction, because the output of the electric power can be stopped by the battery protecting function when the voltage of the electric power generated by the dynamo 19 is insufficient, the battery 4 can be prevented from being over discharged. Thus, the battery 4 can be protected.

In addition, in this embodiment, because the rotational speed detector 18 detects the rotational speed of the rotation support mechanism 14, the electric power generated by the dynamo 19 can be detected easily and inexpensively.

Further, although this embodiment is a system of wind turbine generation in which the rotation support mechanism 14 is rotated by wind power to make the dynamo 19 generate electric power, the battery 4 can be prevented from being over discharged even in the wind turbine generation unstable in generated electric power.

In addition, in this embodiment, because the inverter control part 46 controls the electric power outputting unit provided in the inverter 5, there is no need of providing separate outputting means.

In addition, in this embodiment, in the interval save mode (mode 2) of the battery protecting function, because the output of the electric power to the external load 6 after a predetermined time period elapses after the rotational speed of the rotation support mechanism 14 lowers, the user can get him or herself ready for the stop of the output of the electric power.

Further, in this embodiment, the display changeover switch 63 is provided so that the modes of the battery protecting function can be easily changed over, flexibly coping is possible in accordance with conditions.

In addition, in this embodiment, because the revolutions, the dynamo voltage, the charging voltage, and the load current of the rotation support mechanism 14 can be displayed on the display unit 61, the user can easily check the operating conditions.

In this embodiment, in the save mode or the interval save mode of the battery protecting function, when the battery 4 has not been fully charged, it is judged on the basis of the dynamo voltage obtained from the rotational speed of the rotation support mechanism 14 whether or not the output of the inverter 5 should be stopped. However, it may be judged on the basis of a change in electric power stored in the battery 4 whether or not the output of the inverter 5 should be stopped. Thereby, stable electric power can be supplied to the external load 6 with preventing the battery 4 from being over discharged.

Although the present invention has been described on the basis of a preferred embodiment, changes can be made within a scope not deviating the spirit of the present invention. That is, the present invention may have a construction in which a charging changeover control means controls a charging control section 36 such that supply and stop of the electric power are repeated at stop time intervals corresponding to a charging voltage for charging the battery 4 with electric power.

According to the above construction, when the charging voltage for charging the battery 4 is raised because of large natural energy, the supply time is shortened because of an increase in stop time interval. Thus, the battery 4 is charged with charging current being throttled. On the other hand, when the charging voltage for charging the battery 4 is lowered because of small natural energy, the supply time is elongated because of a decrease in stop time interval. Thus, the battery 4 is charged with charging current as large as possible under a low charging voltage. Therefore, even in case that the charging voltage may change widely due to increase/decrease of the natural energy, the battery 4 can be efficiently charged.

In addition, the present invention may have a construction in which charging changeover control means controls a charging control section 36 (charging changeover means) such that supply and stop of the electric power are repeated at stop time intervals corresponding to a charging voltage for charging the battery 4 with electric power when the charging voltage is not less than a predetermined value, and continues supply of electric power when charging voltage is less than the predetermined value.

According to the above construction, when the charging voltage for charging the battery 4 is not less than the third predetermined value, supply and stop of electric power to the battery 4 are repeated and thereby the battery 4 is charged with charging current being throttled under a high charging voltage. On the other hand, when the charging voltage for charging the battery 4 is less than the third predetermined value, by continuing supply of electric power to the battery 4, the battery 4 is charged with charging current as large as possible under a low charging voltage.

Further, when the charging voltage for charging the battery 4 is raised under the condition that the charging voltage is not less than the third predetermined value, the supply time is shortened because of an increase in stop time interval. Thus, the battery 4 is charged with charging current being throttled. On the other hand, when the charging voltage for charging the battery 4 is lowered under the condition that the charging voltage for charging the battery 4 is not less than the predetermined value, the supply time is elongated because of a decrease in stop time interval. Thus, the battery 4 is charged with charging current as large as possible under a low charging voltage. Therefore, even in case that the charging voltage may change widely due to increase/decrease of the natural energy, the battery 4 can be efficiently charged.

In addition, the power supply unit of this embodiment is so constructed that the charging changeover control means obtains the charging voltage on the basis of the magnitude of natural energy. Thus, the charging voltage can be easily obtained. The wind turbine generator comprises a power supply unit having each construction as described above, thereby the wind turbine generator easy to be influenced by a change in natural environment can be efficiently operated.

Although the present invention has been described on the basis of a preferred embodiment, changes can be made within the scope not deviating from the spirit of the present invention. That is, the auxiliary charger 7 of the embodiment is so constructed as to convert alternating electric power supplied from the external power supply 71, into direct auxiliary electric power with the transformer 72 and the rectifying circuit, and then charge the battery 4 with the direct auxiliary electric power. However, the present invention is not limited to this. That is, the auxiliary charger 7 may be a capacitor having a large capacity that stores direct electric power supplied to the power supply 71 such as a solar cell. Otherwise, the auxiliary charger 7 may be a DC/DC converter that converts direct electric power of a solar cell or the like into direct current of a predetermined voltage to be output.

In addition, in this embodiment, the auxiliary power supply relay 75 is used as switching means. However, the present invention is not limited to this. It may be a semiconductor switch such as a transistor or a thyristor. Further, the switching means such as the auxiliary power supply relay 75 may be provided on the secondary coil 72b of the transformer 72. In addition, the transformer 72 may be a center tap type. In this case, the bridge diode 74 can be made up of two diodes. In addition, the auxiliary charger 7 may have a construction in which the switching means such as the auxiliary power supply relay 75 is disposed on the secondary coil 72b and the capacitor 73 is disposed on the primary coil 72a.

Figure 8:
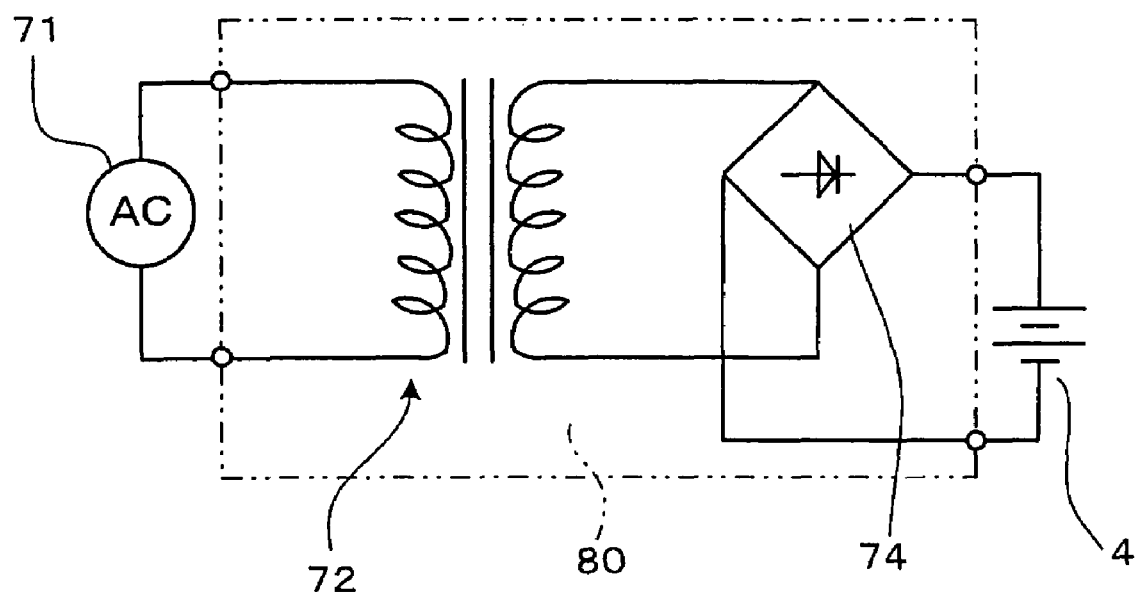
FIG. 8 is a block diagram of the auxiliary charger.

In addition, as shown in FIG. 8, the power supply unit may comprise the battery 4 (storage means) for storing electric power that is used for operations of various devices, the charging means of FIG. 1 (the dynamo 19 and the rectifying section 32) for converting wind energy as natural energy into electric power and charges the battery 4 with the electric power, and an auxiliary charger 80 (auxiliary charging means) for charging the battery 4 with auxiliary electric power by a charging voltage of not less than a predetermined value. The auxiliary charger 80 is the same as one in which the auxiliary power supply relay 75 and the capacitor 73 are eliminated from the above-described circuit construction of FIG. 3. In the auxiliary charger 80, the coils of the transformer 72 are set such that the maximum value of the auxiliary voltage full-wave-rectified by the bridge diode 74 is around a predetermined value, such as 22 V, for example.

Figure 9:
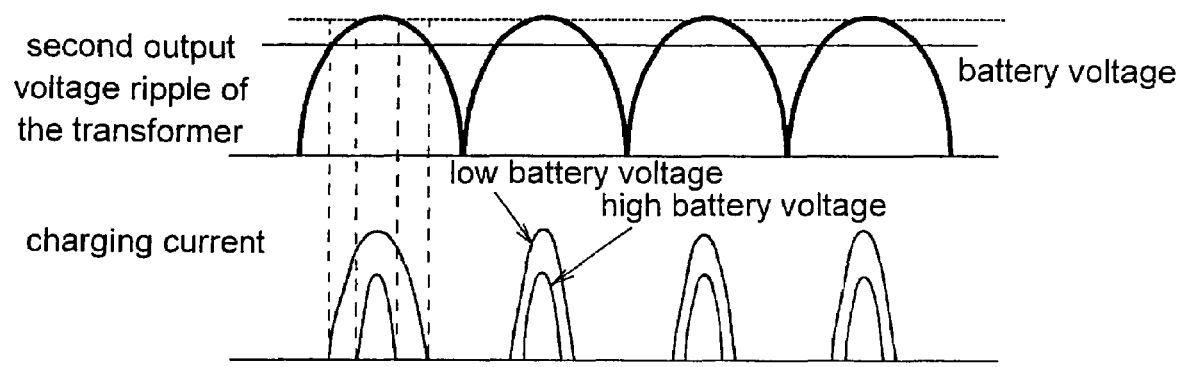
FIG. 9 is a chart for explaining a state of auxiliary charging.

According to the above construction, as shown in FIG. 9, when the charging voltage of the battery 4 has lowered to less than the predetermined value such as 22 V of the auxiliary voltage, the auxiliary charger 80 charges the battery 4 with auxiliary electric power. Thus, the charging voltage of the storage means is always kept at not less than the predetermined value. Further, according to the above construction, the storage means can be charged with auxiliary electric power with a small number of parts. The transformer 72 is preferably provided with transformer taps for changing the output voltage into values of, for example, 12 V, 22 V, 48 V, etc. In this case, the auxiliary voltage can be easily changed in accordance with the specification of the battery 4.

This embodiment has a construction for wind turbine generation in which the rotation support mechanism 14 is rotated by wind power to obtain electric power. However, the present invention is not limited to the construction. The present invention may have a construction in which the rotation support mechanism 14 is rotated by another kind of energy such as water power. Otherwise, the present invention may not comprise the rotation support mechanism 14 but comprise a generator to obtain electric power with a solar cell or the like.

In addition, this embodiment comprises the inverter 5 and the electric power outputting unit of the inverter 5 is so controlled as to supply electric power to the external load 6 connected to the electric power outputting unit. However, the present invention is not limited to such a construction. The electric power outputting unit may be provided separately. In this case, electric power may be directly supplied from the electric power outputting unit to the external load not through the inverter.

Further, in this embodiment, the normal mode and the interval save mode are provided as the battery protecting function, and the modes can be selectively carried out. However, the present invention is not limited to this construction. One of those modes may be provided. Further, the present invention has a construction in which only the save mode may be carried out.

In addition, in this embodiment, the operation display unit 3 includes the display part 61 where each operating condition is displayed. However, the present invention is not limited to this construction. Another operating condition may be displayed, or any condition may not be displayed.

In addition, in this embodiment, when the rotational speed of the rotating shaft clutch exceeds the rotational speed N2, the first and second rotating shaft members are coupled to each other. However, the first and second rotating shaft members may be coupled to each other at a certain interval when the rotational speed N once exceeds the rotational speed N1. In addition, in the above embodiment, the generator using wind power has been described. However, the present invention may be a generator using water power or another kind of natural energy. Further, in the above embodiment, the wind turbine is rotated to convert natural energy into kinetic energy. However, energy conversion may be performed using another kind of member such as a piston that reciprocates vertically.

(Second Embodiment)

Next, a second embodiment of the present invention will be described with reference to FIGS. 11 to 13. A wind turbine generator of this embodiment differs from that of the first embodiment in a feature that the rotating shaft clutch is an energisation operation type. Hereinafter, only the different feature will be described. The same components as in the first embodiment are denoted by the same reference numerals as in the first embodiment, thereby omitting the description.

First, a rotating shaft clutch will be described.

Figure 11:
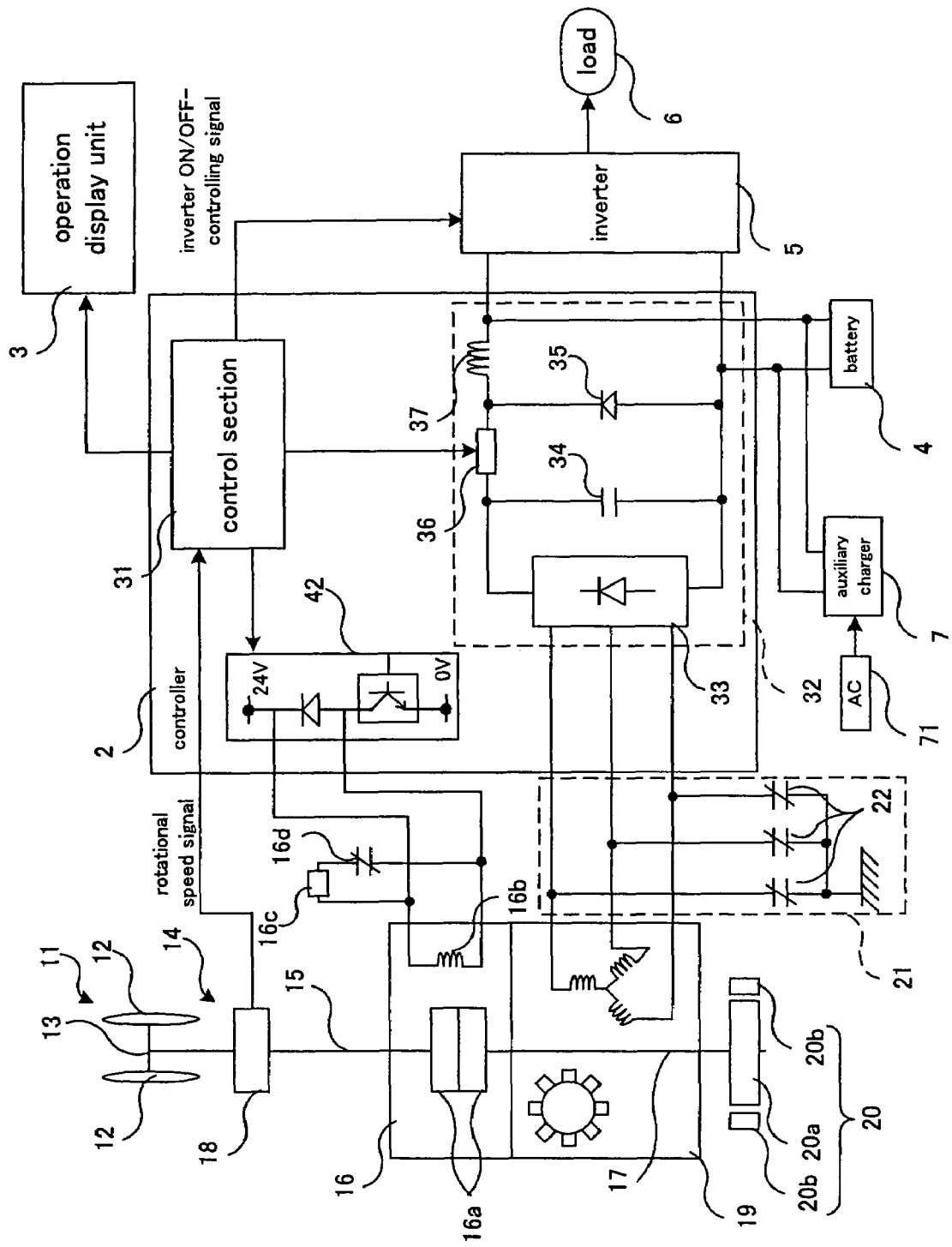
FIG. 11 is a diagram of the whole construction of a wind turbine generator according to a second embodiment of the present invention.
Figure 12:
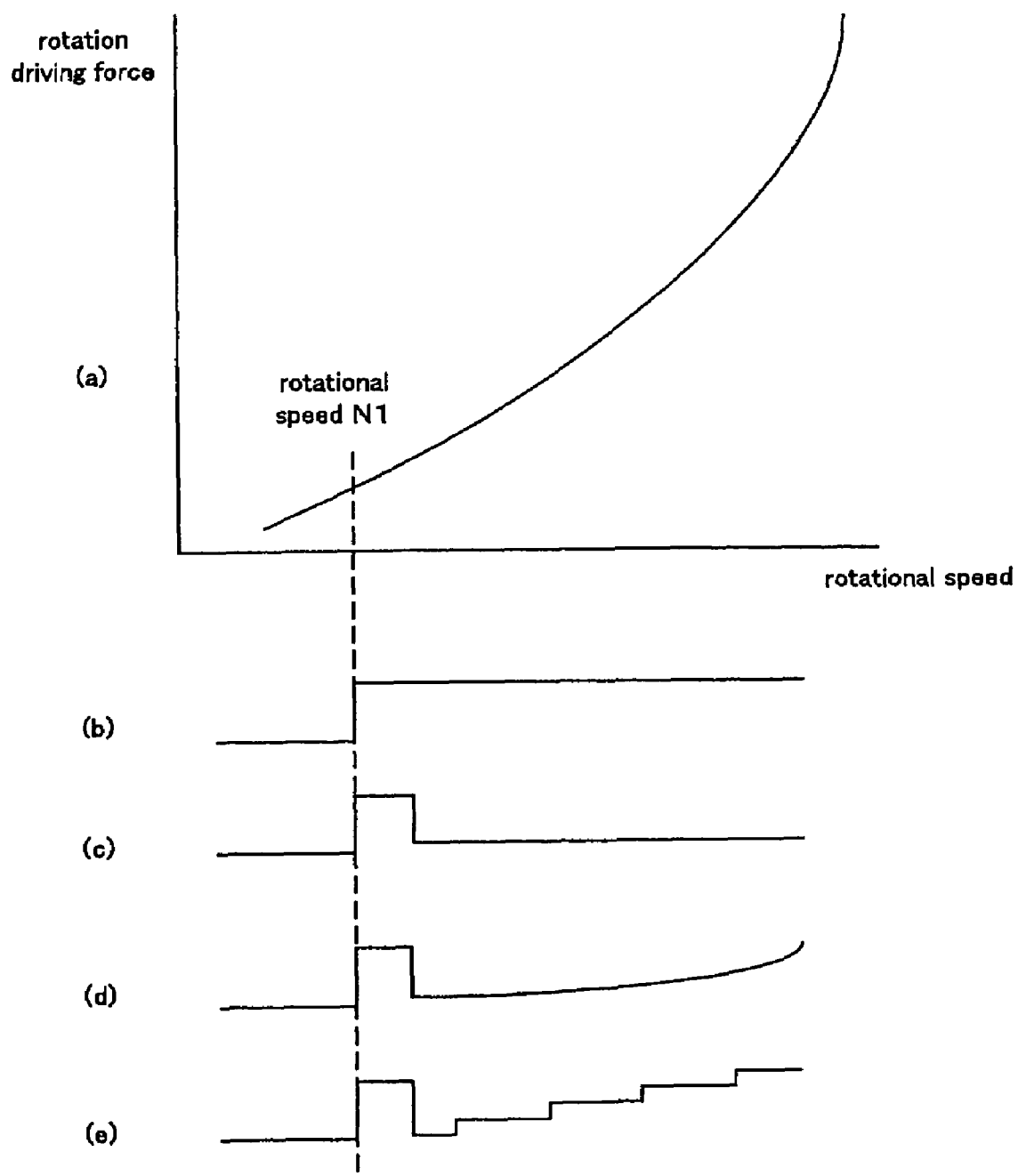
FIG. 12(a) is a graph showing a relation between the rotational speed of a wind turbine and the rotation driving force.
FIG. 12(b) is a chart showing a conventional timing for supplying a clutch operation current to the rotating shaft clutch, relative to the rotational speed of the wind turbine shown in FIG. 12(a).
FIG. 12(c) is a chart showing a conventional timing for supplying a clutch operation current to the rotating shaft clutch, relative to the rotational speed of the wind turbine shown in FIG. 12(a).
FIG. 12(d) is a chart showing a timing for supplying a clutch operation current to the rotating shaft clutch, according to a preferred embodiment, relative to the rotational speed of the wind turbine shown in FIG. 12(a).
FIG. 12(e) shows a modification of FIG. 12(d).

As illustrated in FIG. 11, a rotating shaft clutch 16 interposed between rotating shaft members 15 and 17 is an energisation operation type. More specifically, the rotating shaft clutch 16 includes two clutch plates 16a, a non-illustrated spring member for biasing the clutch plates 16a so as to separate from each other, and a coil member 16b for generating electromagnetic force in the direction opposite to the biasing force of the spring member. In this construction, when a clutch operation current is supplied, the electromagnetic force corresponding to the current value decreases the action of the biasing force to increase the coupling force (clutch force) between the clutch plates 16a. When the electromagnetic force exceeds the biasing force, the clutch plates 16a are coupled to each other so that the rotation driving force of the first rotating shaft member 15 can be sufficiently transmitted to the second rotating shaft member 17. On the other hand, when no clutch operation current is supplied, the biasing force of the spring decreases the coupling force between the clutch plates 16a so that the clutch plates 16a separate from each other.

An auxiliary power supply 16c is connected to the coil member 16b. A connection relay 16d is provided between the coil member 16b and the auxiliary power supply 16c. The connection relay 16d is a deenergization operation type. When the controller 2 is in a usual operation, a signal is sent to the connection relay 16d to open the connection relay 16d. Therefore, no current is supplied from the auxiliary power supply 16c to the coil member 16b. On the other hand, when the controller 2 is under an abnormal condition, the signal to the connection relay 16d is stopped to close the connection relay 16d. Thus, current starts to be supplied from the auxiliary power supply 16c to the coil member 16b. At this time, the deenergization type coil member 16b is in a close state and the first and second rotating shaft members 15 and 17 are coupled to each other. Therefore, although this will be described later, when a short-circuit brake 21 operates upon an abnormal condition, a wind turbine 11 is stopped. The other construction and function are the same as those in the first embodiment and thus the description is omitted.

Next, in the above-described construction, as for an operation of the wind turbine generator, an operating method of the rotating shaft member 16 upon start of operation, which differs from the first embodiment, will be described in detail. As shown in FIG. 12(a), as the rotational speed N of the wind turbine 11 increases, the obtained rotation driving force increases. That is, obtained electric power increases. Conventionally, as shown in FIG. 12(b), when clutch operation current is once supplied to the rotating shaft clutch 16, a certain quantity of clutch operation current is always supplied. Thus, a great deal of clutch operation current is required. In this case, upon a weak wind for example, because the rotational speed N increases slow, it requires a long time to obtain a voltage for charging. Therefore, if the clutch operation current is always supplied to the rotating shaft clutch 16, there is no considerable difference between the electric power obtained by the generation and the electric power consumed. This is not effective.

In addition, as shown in FIG. 12(c), in case that a large clutch operation current is supplied only upon operation of the rotating shaft clutch and the supply of the clutch operation current is decreased after the operation of the rotating shaft clutch, the first and second rotating shaft members 15 and 17 slip on each other when the rotational speed N has increased. This is caused by the fact that the rotational speed of the first rotating shaft member 15 increases as the rotational speed N increases, and the rotational speed of the first rotating shaft member 15 exceeds the frictional force acting between the clutch plates 16a interconnecting the first and second rotating shaft members 15 and 17.

Figure 13:
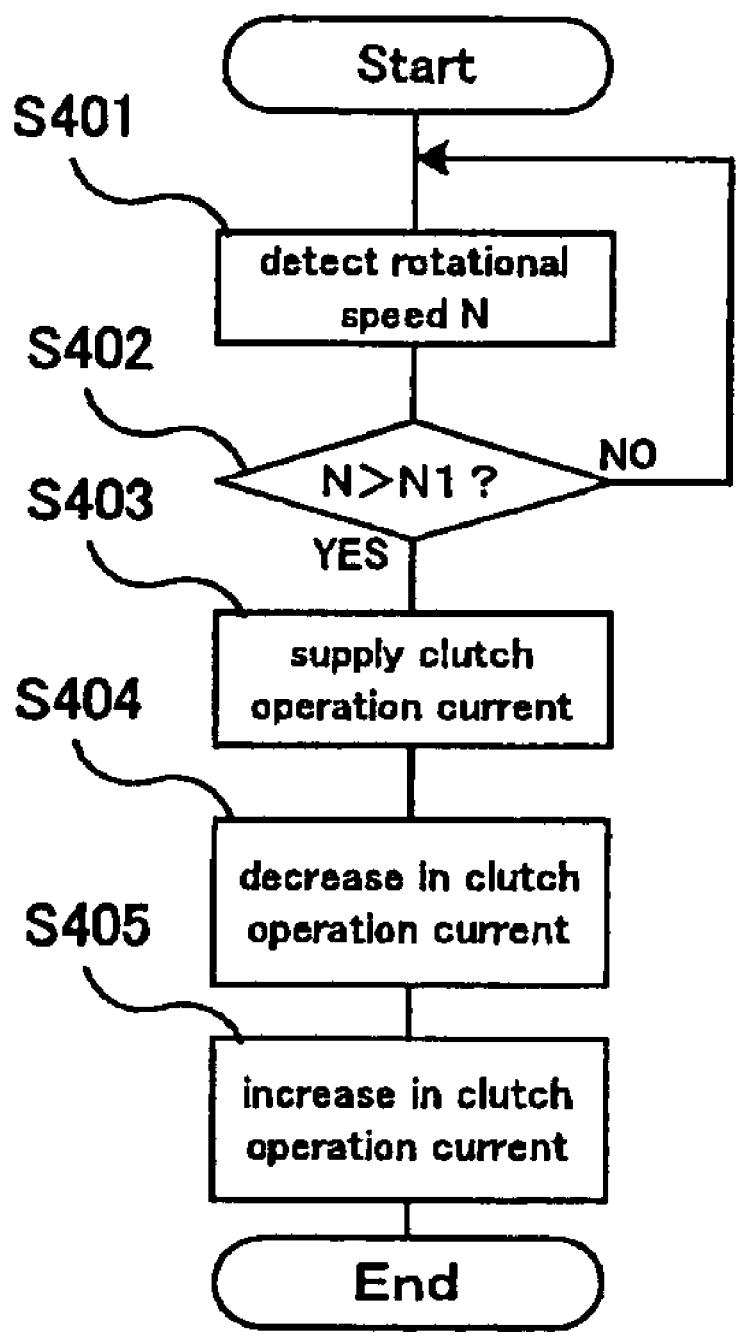
FIG. 13 is a flowchart of an operation in relation to the rotating shaft clutch.

Therefore, in this embodiment, first, in S401 of FIG. 13, the rotational speed detector 18 detects the rotational speed N of the first rotating shaft member 15. The flow then advances to S402, wherein it is judged whether or not the rotational speed N is not less than a rotational speed N1. When the rotational speed N is less than the rotational speed N1 (S402: No), the flow returns to S401. This procedure is repeated till the rotational speed N increases to not less than the rotational speed N1. That is, the first rotating shaft member 15 rotates under a condition of no load and thus the rotational speed N can increase. When the rotational speed N is not less than the rotational speed N1 (S402: Yes), the flow advances to S403, wherein clutch operation current is supplied to the rotating shaft clutch 16. At this time, as shown in FIG. 12(d), the maximum clutch operation current is supplied in order that the clutch plates 16a of the rotating shaft clutch 16 are surely coupled to each other. The rotational speed N1 is a rotational speed at which the rotation never stops even when the first and second rotating shaft members 15 and 17 have been united to each other, that is, a load by coupling is generated.

After the current is supplied to the coil member 16b for a predetermined time, in S404, the current is decreased such that the value of the current never reaches zero. At this time, even when the current has been decreased, the first and second rotating shaft members 15 and 17 can rotate as one body due to the frictional force between the clutch plates 16a. As the rotational speed N of the wind turbine 11 increases, in S405, the current to be supplied is increased accordingly. Because the clutch operation current is increased as the rotational speed increases, the first and second rotating shaft members 15 and 17 can rotate as one body.

The rate of the increase in the clutch operation current is determined in the arithmetic processing part 51 of FIG. 1.

When the frictional force acting between the clutch plates 16a and the rotational force of the first rotating shaft member 15 are balanced, the first and second rotating shaft members 15 and 17 rotate as one body. As described above, the rotational force increases as the rotational speed N of the first rotating shaft member 15. Thus, to balance the forces, the frictional force between the clutch plates 16a may be increased. That is, the coupling force between the clutch plates 16a may be increased. Thus, the clutch operation current to be supplied to the rotating shaft clutch 16 may be increased.

Therefore, in the arithmetic processing part 51, first, the rotational force corresponding to each rotational speed N of the first rotating shaft member 15 is obtained. Next, the friction force to be balanced with the rotational force, that is, the coupling force between the clutch plates 16a, is obtained. Further, the quantity of supply of the clutch operation current to obtain the coupling force is obtained. An equation of the relation between the obtained rotational speed N and clutch operation current is then made. On the basis of the equation, the clutch driving part 42 increases the clutch operation current as the rotational speed N increases, as shown in FIG. 12(d).

Next, an operation of the abnormal operation braking function will be described.

(Abnormal Operation Braking Function)

As illustrated in FIG. 2, when the wind turbine generator is in normal operation, the short-circuit relay 22 of the short-circuit brake 21 is energized to be open. The alternating electric power from the dynamo 19 is supplied to the rectifying section 32 of the bridge diode 33 and so on to charge the battery 4. On the other hand, when the controller 2 is brought into an emergency stop because of an abnormal condition such as wear or damage of parts, all signal outputs being output to the wind turbine generator main body 1 and so on are stopped. As a result, because energizing the short-circuit relay 22 of the short-circuit brake 21 is stopped, the dynamo 19 is brought into a short-circuited state.

The above-described auxiliary power supply 16c is connected to the rotating shaft clutch 16. When the controller 2 is in an emergency stop, the deenergization operation type connection relay 16d operates to supply current from the auxiliary power supply 16c to the coil member 16b. Thereby, the clutch plates 16a are brought into a strongly coupled state because the rotating shaft clutch 16 is an energisation operation type. Thereby, the first rotating shaft member 15 and the second rotating shaft member 17 of the rotation support mechanism 14 is united by the rotating shaft clutch 16. Thus, the rotational speed of the rotation support mechanism 14 is rapidly decreased due to the heavy load by the dynamo 19 in the short-circuited state.

As described above, the power supply unit of this embodiment comprises a driving force generation means (the wind turbine 11) for generating driving force by converting natural energy into kinetic energy, an electric power generation means (the dynamo 19 for generating electric power by being operated by the driving force, an energization operation type clutch means (the rotating shaft clutch 16) for changing over with clutch force (coupling force) corresponding to operation current between transmission and interruption of the driving force from the driving force generation means to the electric power generation means, and clutch control means (the clutch driving part 42) for outputting the operation current to the clutch means with controlling the operation current to increase the clutch force in accordance with the driving force.

As described above, according to this embodiment, the clutch operation current to be supplied to the rotating shaft clutch 16 is controlled in accordance with the rotational speed of the first rotating shaft member 15. Therefore, the consumption of the clutch operation current can be decreased. In comparison with the case wherein a certain clutch operation current continues to be supplied to the rotating shaft clutch 16, the ratio of the electric power obtained by generation to the clutch operation current used in the generation is improved. This realizes effective electric power generation. That is, a large amount of electric power can be obtained with low consumption.

In addition, according to this embodiment, because electric power is generated using wind power as a kind of natural energy, the generator can be disposed without particularly selecting the place. For example, in case of water power, the place is limited to the vicinity of a river. In addition, because the wind turbine 11 to be rotated by wind power is used, the structure can be simplified in comparison with a case of generating with another structure.

In a modification of this embodiment, as shown in FIG. 12(e), the clutch operation current may be increased stepwise. In this case, a translation table is prepared in a non-illustrated memory area within the controller 2. The table stores therein values of the relation between the above-described rotational speed N and clutch operation current. At this time, to a certain rotational speed N, the magnitude of the clutch operation current is determined within a range wherein the clutch plates 16a can not slip on each other. Thereby, even when the rotational speed N increases in a certain range, a constant clutch operation current is supplied. Thus, the clutch operation current is increased stepwise. In this case, even when the rotational speed N increases in a certain range, because a constant clutch operation current is supplied in that range, the consumption can be further decreased and the control is simplified.

Although the present invention has been described on the basis of a preferred embodiment, changes can be made within a scope not deviating the spirit of the present invention.

That is, in the embodiment, the clutch operation current is increased curvedly or stepwise. However, the present invention is not limited to this. It suffices if the first and second rotating shaft members 15 and 17 can rotate as one body. In addition, a large clutch operation current is supplied upon start of an operation of the rotating shaft clutch 16 to surely couple the first and second rotating shaft members 15 and 17. However, in order to further decrease the consumption of the clutch operation current, the clutch operation current may be supplied gradually from the start of the operation of the rotating shaft clutch 16.

In addition, the program for realizing each function in the above-described first and second embodiments may have been written in a ROM of the memory unit in a read only manner. Otherwise, the program recorded in a record medium such as a CD may be read out at need to be written in the memory unit. Further, the program transmitted through an electrical communication line such as the Internet may be written in the memory unit.

Although the invention has been described in the above-preferred embodiments, the invention is never limited to those. It is to be understood that various embodiments not deviating from the spirit and scope of the invention can be made. Further, although operations and effects of the constructions of the invention have been described in the embodiments, the operations and effects are by way of example and never limit the invention.

The invention claimed is:

1. A power supply unit comprising:
    a storage means for storing electric power that is used for operations of various devices;
    a charging means for transforming natural energy into an electrical energy, and charging by supplying an electric power as the electric energy to said storage means;
    a charging changeover means for changing over between supply and stop of the electric power from said charging means to said storage means; and
    a charging changeover control means for controlling said charging changeover means such that supply and stop of said electric power are repeated when a charging voltage for charging said storage means with electric power is not less than a predetermined value, and continues supply of said electric power when said charging voltage is less than the predetermined value.

2. The power supply unit according to claim 1, wherein said charging changeover control means obtains said charging voltage on the basis of the magnitude of said natural energy.

3. A wind turbine generator comprising the power supply unit according to claim 1.

4. A power supply unit comprising:
    a storage means for storing electric power that is used for operations of various devices;
    a charging means for transforming natural energy into an electrical energy, and charging by supplying an electric power as the electric energy to said storage means;
    a charging changeover means for changing over between supply and stop of the electric power from said charging means to said storage means; and
    a charging changeover control means for controlling said charging changeover means such that supply and stop of said electric power is changed over at stop time intervals corresponding to a charging voltage for charging said storage means with electric power.

5. A power supply unit comprising:
    a storage means for storing electric power that is used for operations of various devices;
    a charging means for transforming natural energy into an electrical energy, and charging by supplying an electric power as the electric energy to said storage means;
    a charging changeover means for changing over between supply and stop of the electric power from said charging means to said storage means; and
    a charging changeover control means for controlling said charging changeover means such that supply and stop of said electric power are repeated at stop time intervals corresponding to a charging voltage for charging said storage means with electric power when said charging voltage is not less than a predetermined value, and continues supply of said electric power when said charging voltage is less than the predetermined value.

6. A generator comprising:
    an electric power generation means for generating electric power;
    a storage means for storing electric power generated by said electric power generation means;
    an output means for outputting electric power stored in said storage means to an external load or stopping the output;
    a voltage detection means for detecting a voltage of the electric power generated by said electric power generation means; and
    a control means for controlling said output means;
    said control means stops the output of electric power to said external load when the voltage detected by said voltage detection means is not more than a predetermined value.

7. The generator according to claim 6, further including a stored electric power detection means for detecting an amount of electric power stored in said storage means; and
    said control means stops the output of electric power to said external load when the voltage detected by said voltage detection means is not more than a predetermined value and the amount of electric power detected by said stored electric power detection means is not more than a predetermined value.

8. The generator according to claim 6, wherein said electric power generation means generates electric power by converting kinetic energy for a rotating shaft into electric power, and
    said voltage detection means detects the voltage on the basis of the number of revolutions of said rotating shaft.

9. The generator according to claim 6, wherein a rotating shaft of said electric power generation means is rotated by wind power.

10. The generator according to claim 6, further including an inverter for converting electric power stored in said storage means into electric power having a specific wavelength and outputting the electric power to said external load, and
    said output means is included in said inverter.

11. The generator according to claim 6, wherein said control means stops the output of the electric power to said external load after a predetermined time period elapses, when said control means stops the output.

12. The generator according to claim 6, further including a memory means for storing operation contents of said control means, and
    said control means determines on the basis of the operation contents stored in said memory means whether or not the output of the electric power to said external load should be stopped when the voltage detected by said voltage detection means is not more than the predetermined value.

13. The generator according to claim 12, further comprising operation means for rewriting memory contents of said memory means on the basis of an operation of a user.

14. The generator according to claim 6, further comprising display means for displaying at least one of the number of revolutions of said shaft of said electric power generation means, electric power generated by said electric power generation means, the amount of electric power stored in said storage means, current of the electric power stored in said storage means, current of electric power consumed by said external load, and storage contents stored in said memory means.

15. A power supply unit comprising:
    a storage means for storing electric power that is used for operations of various devices;
    a charging means for transforming natural energy into an electrical energy, and charging said storage means with the electric energy;
    an auxiliary charging means for charging said storage means with auxiliary electric power; and
    a charging control means for monitoring a charging voltage of said storage means and permitting that said auxiliary charging means charge auxiliary electric power to said storage means when said charging voltage is less than a predetermined value.

16. The power supply unit according to claim 15, wherein said auxiliary charging means comprises:
- an auxiliary power supply means for outputting auxiliary electric power as direct current of a predetermined voltage; and
- a changeover means for changing over between supply and stop of said auxiliary electric power to said storage means by said charging control means.

17. A wind turbine generator comprising the power supply unit according to claim 15.

18. A power supply unit comprising:
- a storage means for storing electric power that is used for operations of various devices;
- a charging means for transforming natural energy into an electrical energy, and charging said storage means with the electric energy;
- an auxiliary charging means for charging said storage means with auxiliary electric power such that said storage means has a charging voltage of not less than a predetermined value.

19. A wind turbine generator comprising the power supply unit according to claim 18.

20. A power supply unit comprising:
- a driving force generation means for generating driving force by converting natural energy into kinetic energy;
- a measurement means for measuring the magnitude of said driving force;
- an electric power generation means for generating electric power by being operated with the driving force of said driving force generation means;
- a changeover means for changing over between transmission and interruption of the driving force of said driving force generation means to said electric power generation means; and
- a changeover control means for controlling said changeover means such that the driving force from said driving force generation means to said electric power generation means is interrupted when the magnitude of said driving force measured by said measurement means is less than a predetermined value, and the driving force is transmitted from said driving force generation means to said electric power generation means when the magnitude of said driving force is not less than the predetermined value.

21. The power supply unit according to claim 20, wherein said changeover control means comprises a transmission inhibition means for inhibiting the transmission of the driving force from said driving force generation means to said electric power generation means till the magnitude of said driving force has increased to not less than a transmission start value obtained by adding a certain value to said predetermined value when the magnitude of said driving force increases from less than said predetermined value to not less than said predetermined value.

22. The power supply unit according to claim 20, wherein said driving force generation means comprises:
- a rotation body which rotates by said natural energy; and
- a rotating shaft which rotates together with said rotation body.

23. The power supply unit according to claim 20, wherein said measurement means measures the rotational speed of said rotation body.

24. The power supply unit according to claim 20, wherein said natural energy is wind power.

25. A generator comprising the power supply unit according to claim 20.

26. A power supply unit comprising:
- a driving force generation means for generating driving force by converting natural energy into kinetic energy;
- an electric power generation means for generating electric power by being operated with said driving force;
- a energisation operation type clutch means for changing over with clutch force corresponding to operation current between transmission and interruption of the driving force from said driving force generation means to said electric power generation means; and
- a clutch control means for outputting said operation current to said clutch means with controlling said operation current such that said clutch force is increased in accordance with said driving force.

27. The power supply unit according to claim 26, wherein said clutch control means outputs an operation current to generate a large clutch force for operation start when said clutch means is changed over from an interruption state to a transmission state.

28. The power supply unit according to claim 26, wherein said clutch control means controls said operation current such that said clutch force is increased stepwise.

29. The power supply unit according to claim 26, wherein said driving force generation means comprises:
- a rotation body which rotates by said natural energy; and
- a rotating shaft which rotates together with said rotation body.

30. The power supply unit according to claim 29, wherein said natural energy is wind power.

31. A generator comprising the power supply unit according to claim 26.

* * * * *